(12) United States Patent
Machida et al.

(10) Patent No.: US 9,181,050 B2
(45) Date of Patent: Nov. 10, 2015

(54) SHEET FEEDING APPARATUS, CONTROL METHOD THEREOF, AND DOCUMENT READING APPARATUS

(75) Inventors: Takashi Machida, Niiza (JP); Hiroshi Komuro, Wako (JP); Hiroki Kitagawa, Tokyo (JP)

(73) Assignee: Canon Denshi Kabushiki Kaisha, Saitama-ken (JP)

( * ) Notice: Subject to any disclaimer, the term of this patent is extended or adjusted under 35 U.S.C. 154(b) by 659 days.

(21) Appl. No.: 13/292,407

(22) Filed: Nov. 9, 2011

(65) Prior Publication Data
US 2012/0113488 A1 May 10, 2012

(30) Foreign Application Priority Data

Nov. 10, 2010 (JP) ................................ 2010-252192
Nov. 19, 2010 (JP) ................................ 2010-259495
Apr. 19, 2011 (JP) ................................ 2011-093497

(51) Int. Cl.
*H04N 1/04* (2006.01)
*B65H 7/12* (2006.01)
*B65H 3/06* (2006.01)
(Continued)

(52) U.S. Cl.
CPC .............. *B65H 3/063* (2013.01); *B65H 3/0653* (2013.01); *B65H 3/5284* (2013.01); *B65H 3/56* (2013.01); *B65H 7/125* (2013.01); *H04N 1/0062* (2013.01); *B65H 2403/512* (2013.01); *B65H 2403/514* (2013.01); *B65H 2403/53* (2013.01); *B65H 2511/22* (2013.01); *B65H 2511/514* (2013.01); *B65H 2511/524* (2013.01); *B65H 2513/512* (2013.01); *B65H 2513/514* (2013.01); *B65H 2701/1311* (2013.01);
(Continued)

(58) Field of Classification Search
None
See application file for complete search history.

(56) References Cited

U.S. PATENT DOCUMENTS 5,533,821 A * 7/1996 Awai et al. ................... 400/619
5,534,973 A * 7/1996 Harada ............................ 399/1
(Continued)

FOREIGN PATENT DOCUMENTS

JP 56-072849 U 11/1979
JP 5-319618 12/1993
(Continued)

OTHER PUBLICATIONS

Japanese Office Action issued in counterpart Japanese Patent Application No. 2010-252192, dated Sep. 16, 2014.
(Continued)

*Primary Examiner* — Barbara Reinier
*Assistant Examiner* — Pawandeep Dhingra
(74) *Attorney, Agent, or Firm* — Fitzpatrick, Cella, Harper & Scinto

(57) ABSTRACT

A sheet feeding apparatus comprises a conveying path formed between an upper and a lower units facing each other; a feed roller which feeds a sheet by a portion partially exposed from an upper surface of the lower unit to the conveying path; a separation member disposed to oppose the feed roller; a stopper which stops entrance of the sheet into the conveying path by abutting against a sheet end in a closed state in which the stopper is moved in a direction to intersect with an exposed surface of the feed roller; a driving unit which drives at least the feed roller and the stopper; and a control unit which controls the driving unit to rotate the feed roller through a predetermined angle in a sheet feeding direction and to then open the stopper when feeding of the sheet is started from the closed state of the stopper.

9 Claims, 23 Drawing Sheets

(51) Int. Cl.
- *B65H 3/52* (2006.01)
- *B65H 3/56* (2006.01)
- *H04N 1/00* (2006.01)
- H04N 1/203 (2006.01)
- H04N 1/12 (2006.01)

(52) U.S. Cl.
CPC .... *B65H 2701/1313* (2013.01); *B65H 2801/39* (2013.01); *H04N 1/1215* (2013.01); *H04N 1/2034* (2013.01)

(56) References Cited

U.S. PATENT DOCUMENTS

| | | | |
|---|---|---|---|
| 5,819,151 A * | 10/1998 | Naito et al. | 399/367 |
| 6,168,146 B1 * | 1/2001 | Komuro et al. | 271/10.12 |
| 6,315,284 B1 | 11/2001 | Komuro et al. | |
| 6,392,763 B1 * | 5/2002 | Nishinohara et al. | 358/496 |
| 7,621,522 B2 | 11/2009 | Yasukawa et al. | |
| 7,872,783 B2 | 1/2011 | Kitagawa et al. | |
| 7,905,484 B2 | 3/2011 | Komuro | |
| 2003/0026633 A1 * | 2/2003 | Nakagawa et al. | 399/367 |
| 2008/0203652 A1 * | 8/2008 | Yasukawa et al. | 271/117 |
| 2009/0160119 A1 * | 6/2009 | Komuro | 271/10.11 |
| 2011/0127712 A1 | 6/2011 | Komuro | |

FOREIGN PATENT DOCUMENTS

| | | | | |
|---|---|---|---|---|
| JP | H10-035897 | * | 2/1998 | B65H 1/06 |
| JP | 10-236689 | | 9/1998 | |
| JP | 1111707 A | | 1/1999 | |
| JP | 2004099212 A | | 4/2004 | |
| JP | 3677356 | | 5/2005 | |
| JP | 2006312527 A | | 11/2006 | |
| JP | 2008207944 A | | 9/2008 | |
| JP | 2008219536 A | | 9/2008 | |
| JP | 2008-270954 | | 11/2008 | |
| JP | 2009149406 A | | 7/2009 | |

OTHER PUBLICATIONS

Japanese Office Action issued in Corresponding Japanese Application No. 2010-259495 dated Jul. 22, 2014.
Japanese Office Action issued in corresponding Japanese Application No. 2011-093497 dated Feb. 13, 2015.

* cited by examiner

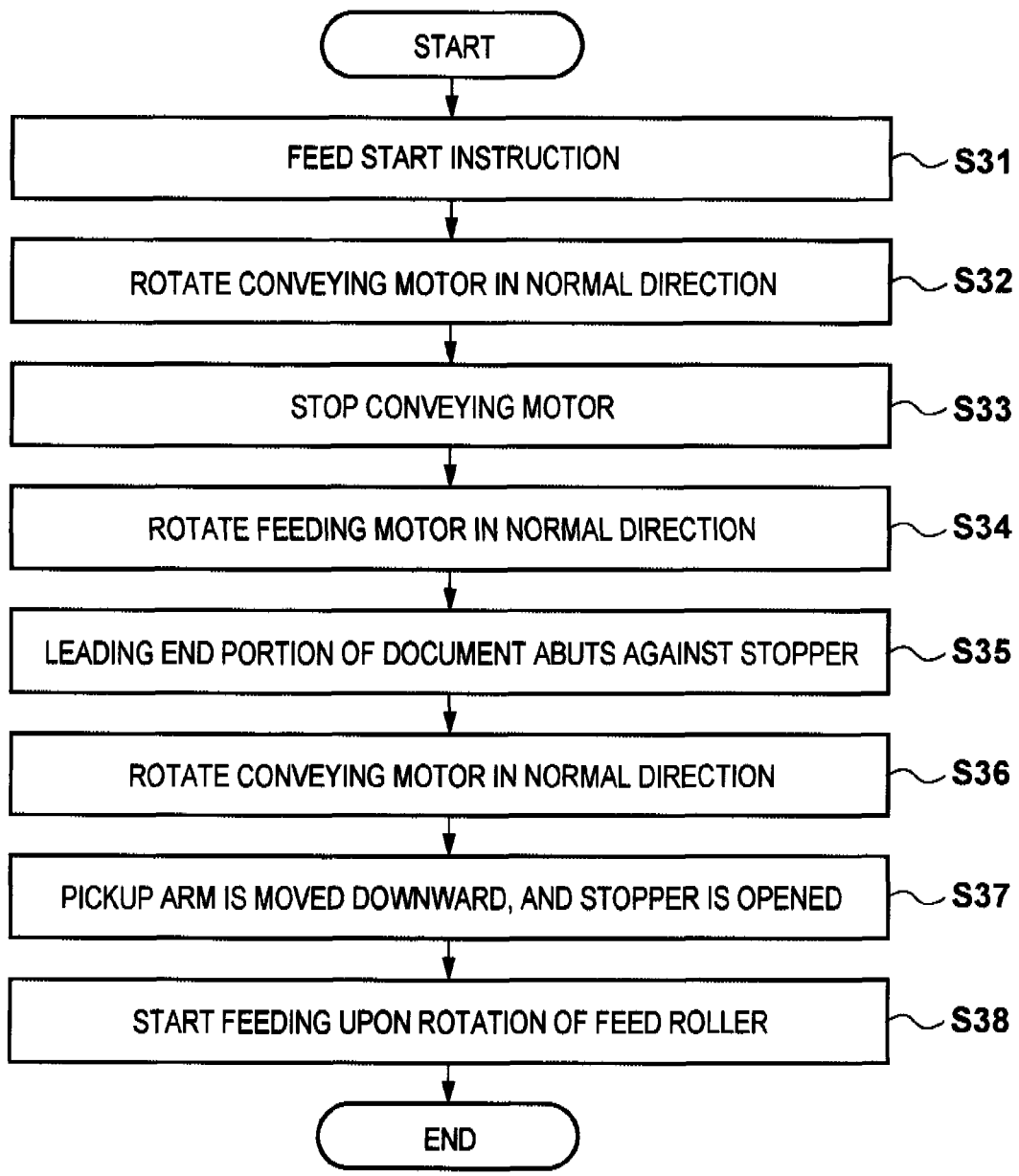

SHEET FEEDING APPARATUS, CONTROL METHOD THEREOF, AND DOCUMENT READING APPARATUS

BACKGROUND OF THE INVENTION

1. Field of the Invention

The present invention relates to a sheet feeding apparatus for feeding a sheet and a control method thereof, and a document reading apparatus for reading information on a document as a sheet.

2. Description of the Related Art

FIG. 9 shows a schematic structure of a conventional document reading apparatus 1'. Note that since a principal structure will be explained by denoting the same components by the same reference numerals in embodiments, only required portions will be mentioned. Referring to FIG. 9, a feed roller 3 feeds, onto a conveying path RT, a lowermost sheet S1, which is separated one by one from a document bundle S placed on a feed tray 4 by a separation roller 5 that rotates in a direction opposite to the feed roller 3 while being in pressure-contact with the feed roller 3. On the conveying path RT, image reading units 6a and 6b are disposed, and read information on the sheet S1, which is conveyed by a pair of upstream-side conveying rollers 11a and 11b and a pair of downstream-side conveying rollers 12a and 12b.

Japanese Patent No. 3677356 discloses an arrangement in which a movable guide is disposed outside the outer surface of a feed roller, so as to prevent leading ends of documents from contacting the feed roller upon setting documents.

In the conventional document reading apparatus 1', when the document bundle S is set on the feed tray 4, the feed roller 3 is partially exposed from the upper surface of the conveying path RT. This is because even a document with folds can be surely gripped and conveyed by the feed roller 3. For this reason, the leading end portion of the lowermost sheet S1 abuts against the outer surface of the feed roller 3 to stop its forward movement, so as to set a state in which upper documents approach a pressure-contact surface (nip) between the feed roller 3 and separation roller 5 (to be referred to as an inversely aligned state). When feeding operations are continued in the inversely aligned state, since an upper document is picked up earlier, so-called multi-feeding (a plurality of documents are fed simultaneously without separating the document bundle S one by one) tends to occur.

In Japanese Patent No. 3677356 above, in order to prevent the inversely aligned state, the movable guide is used to prevent the leading end portions of documents from contacting the feed roller upon setting the documents. However, documents such as four-folded documents with central folds abut against the feed roller to cause the inversely aligned state.

Note that the aforementioned problem is posed not only in the document reading apparatus but it may be similarly posed in a sheet feeding apparatus which separates and feeds sheets.

SUMMARY OF THE INVENTION

The present invention has been made in consideration of the aforementioned problems, and realizes a sheet feeding apparatus and control method thereof, and a document reading apparatus, which can prevent an inversely aligned state of a document bundle and can improve feeding performance.

In order to solve the aforementioned problems, the present invention provides a sheet feeding apparatus comprising: a conveying path formed between an upper unit and a lower unit, which are disposed to face each other; a feed roller which feeds a sheet by a portion partially exposed from an upper surface of the lower unit to the conveying path; a separation member which is disposed to oppose the feed roller; a stopper which stops entrance of the sheet into the conveying path by abutting against a sheet end in a closed state in which the stopper is moved in a direction to intersect with an exposed surface of the feed roller; a driving unit which drives at least the feed roller and the stopper; and a control unit which controls the driving unit to rotate the feed roller through a predetermined angle in a sheet feeding direction and to then open the stopper when feeding of the sheet is started from the closed state of the stopper.

According to the present invention, an inversely aligned state of a sheet bundle can be prevented, and feeding performance can be improved.

Further features of the present invention will become apparent from the following description of exemplary embodiments (with reference to the attached drawings).

BRIEF DESCRIPTION OF THE DRAWINGS

FIG. 13 is a flowchart showing the operation at a feed start timing of the document reading apparatus according to the modification of the embodiment;

DESCRIPTION OF THE EMBODIMENTS

Embodiments for carrying out the present invention will be described in detail hereinafter with reference to the accompanying drawings. Embodiments to be described hereinafter are examples upon practicing the present invention, and the present invention is not limited to the following embodiments. Sizes, materials, shapes, relative layouts, and the like of components according to this embodiment should be modified or changed as needed depending on arrangements and various conditions of apparatuses to which the present invention is applied without departing from the scope of the present invention.

First Embodiment

A document reading apparatus which mounts a sheet feeding apparatus according to an embodiment of the present invention will be described below. Note that an upstream or downstream side in a conveying path is set with reference to the conveying direction of a sheet throughout the following description.

<Arrangement of Apparatus>

The arrangement of the document reading apparatus of this embodiment will be described below with reference to FIGS. 1 to 3.

Figure 1:
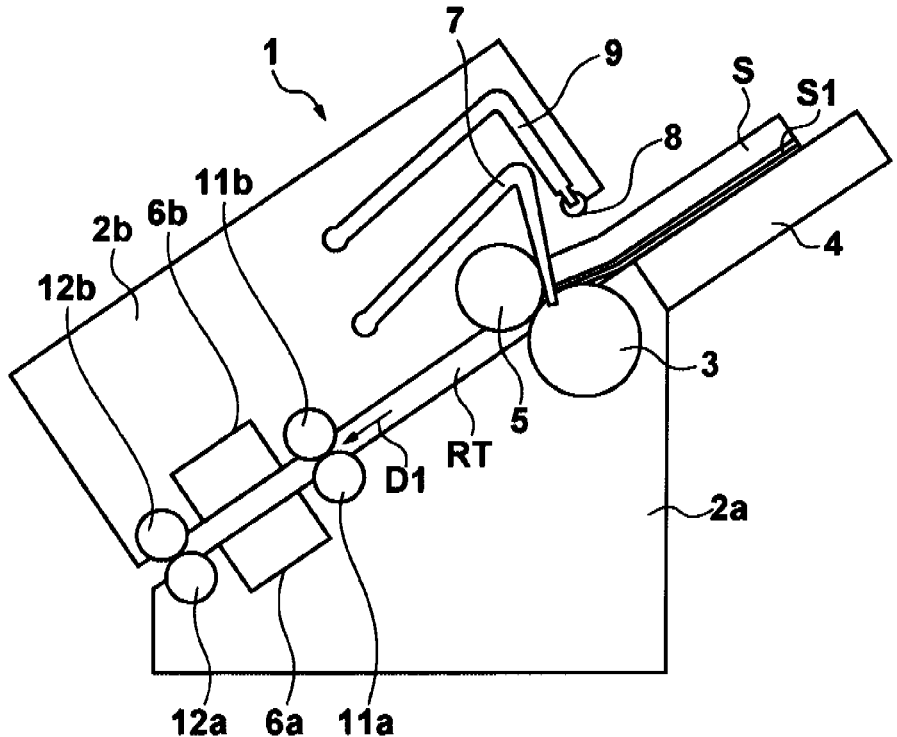
FIG. 1 is a schematic side sectional view showing the arrangement in a standby state of a document reading apparatus according to an embodiment.

As shown in FIG. 1, in a document reading apparatus 1 of this embodiment, an arrangement other than sensors for reading images on a document is basically that of a sheet feeding apparatus. In such document reading apparatus 1, for example, a lower guide unit 2a which configures a lower conveying path and an upper guide unit 2b which configures an upper conveying path are disposed to face each other, and a space (gap) sandwiched between these upper and lower guide units 2b and 2a forms a conveying path RT of sheets S. The conveying path RT has a slope from the upper right side toward the lower left side in FIG. 1. Sheets S as documents to be read are, for example, OA sheets, checks, and the like.

The lower guide unit 2a includes a feed roller (an example of a feed roller) 3, a feed tray 4, a lower image reading unit 6a, an upstream-side conveying roller 11a, and a downstream-side conveying roller 12a. The upper guide unit 2b includes a separation roller 5 which contacts the feed roller 3, a stopper 7, a pickup roller 8 and pickup arm 9, which are exemplified as a pickup unit, an upper image reading unit 6b, an upstream-side conveying roller 11b, and a downstream-side conveying roller 12b.

The lower and upper image reading units 6a and 6b are disposed to face each other to sandwich the conveying path RT between them. The pair of upstream-side conveying rollers 11a and 11b and the pair of downstream-side conveying rollers 12a and 12b contact each other on the conveying path RT, the rollers on the lower guide unit side are driving rollers, and those on the upper guide unit side are driven rollers.

The feed roller 3 is disposed to be partially exposed from the upper surface of the conveying path RT, and feeds a lowermost sheet S1 of a document bundle S placed on the feed tray 4 to the downstream side. The separation roller 5 is disposed to oppose the feed roller 3 on slightly the downstream side of a rotational axis of the feed roller 3. The separation roller 5 contacts the feed roller 3, and is rotated independently of the feed roller 3. The separation roller 5 presses the feed roller 3 and is rotated in a direction opposite to the feed roller 3 to separate the sheet S1 from the document bundle S one by one. Note that since the separation roller 5 need only generate a relative rotation difference from the feed roller 3, it need not have the form of a roller and may be substituted by a rubber pad-like separation member, which is not rotated.

The lower and upper image reading units 6a and 6b optically read images on lower and upper faces of the sheet S1, which is stably conveyed while being clipped on the upstream and downstream sides upon rotation of the upstream-side conveying rollers 11a and 11b and downstream-side conveying rollers 12a and 12b. Each of the image reading units 6a and 6b, for example, reads image data by optically scanning an image and converting the scanned image into an electrical signal, and includes a light source such as an LED, image sensor, lens array, and the like.

The stopper 7 has a function of opening/closing a route to the conveying path RT, and stops a leading end portion of the document bundle S placed on the feed tray 4 in a closed state immediately before they enter a pressing surface (nip) between the feed roller 3 and separation roller 5. The pickup roller 8 is axially supported to be rotatable on a distal end portion of the pickup arm 9 and to be retractable from the document bundle S, and presses the document bundle S released from the stopper 7 toward the feed roller side from an uppermost sheet.

Figure 2:
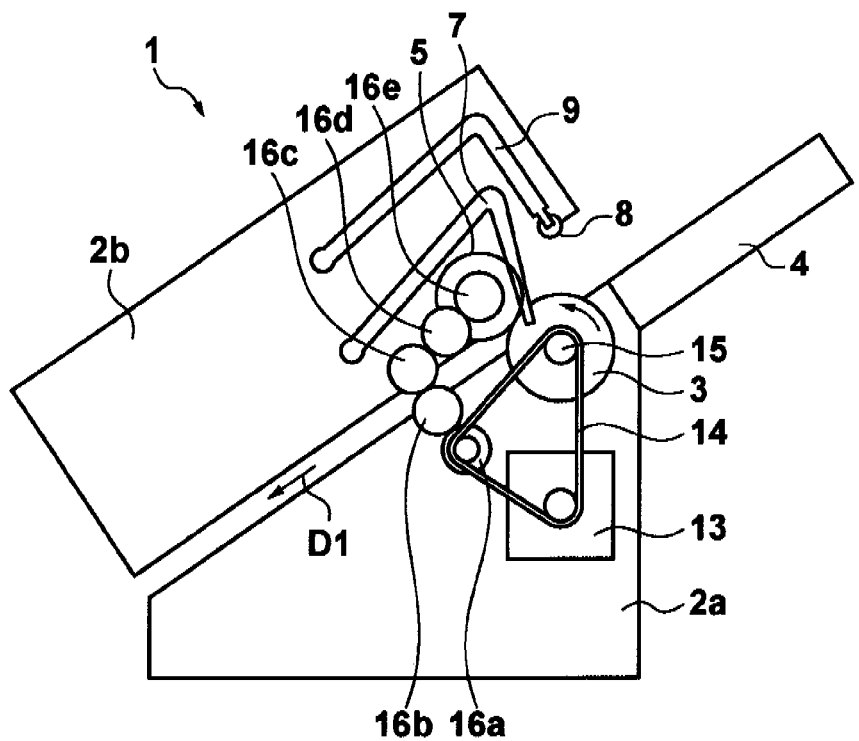
FIG. 2 is a schematic side sectional view showing the arrangement of a feeding driving system of the document reading apparatus according to the embodiment.

As shown in FIG. 2, the lower guide unit 2a includes a feeding motor 13. The feeding motor 13 rotates the feed roller 3 in a document conveying direction D1 via a timing belt 14 and gear 15. At the same time, the feeding motor 13 rotates the separation roller 5 via the timing belt 14 and a gear train including gears 16a to 16e. Note that a direction for rotating the feed roller 3 in the document conveying direction D1 is defined as a normal direction (rotation), and a direction opposite to that direction is defined as a reverse direction (rotation).

Figure 3:
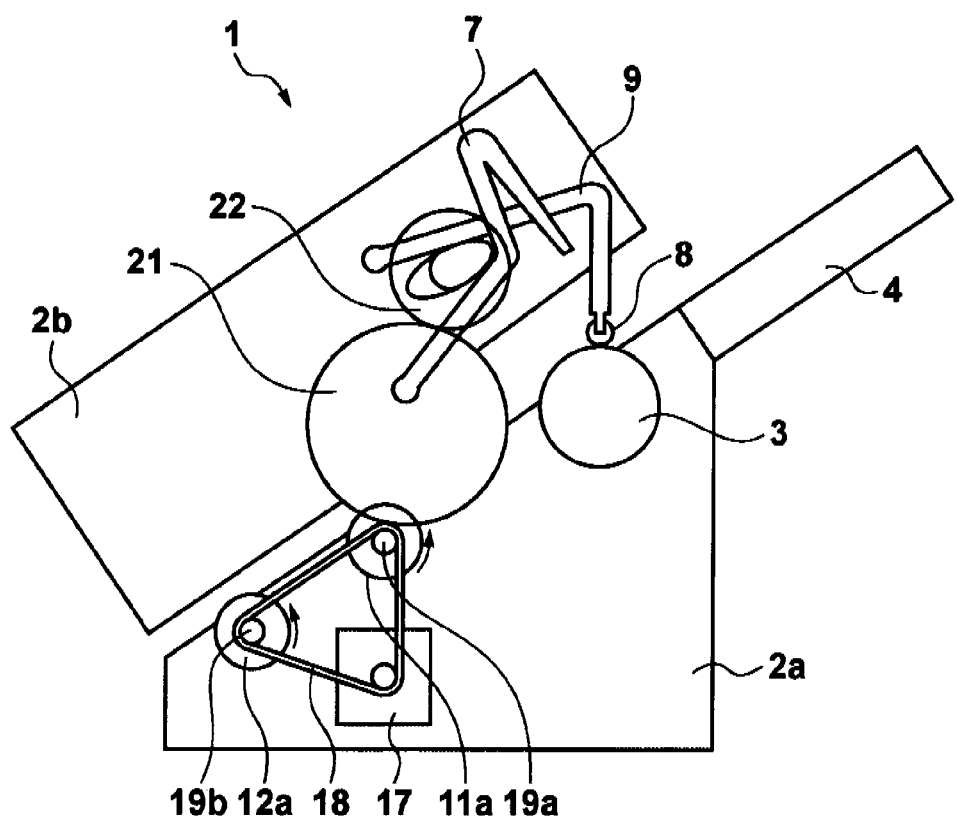
FIG. 3 is a schematic side sectional view showing the arrangement of a conveying driving system of the document reading apparatus according to the embodiment.
Figure 4:
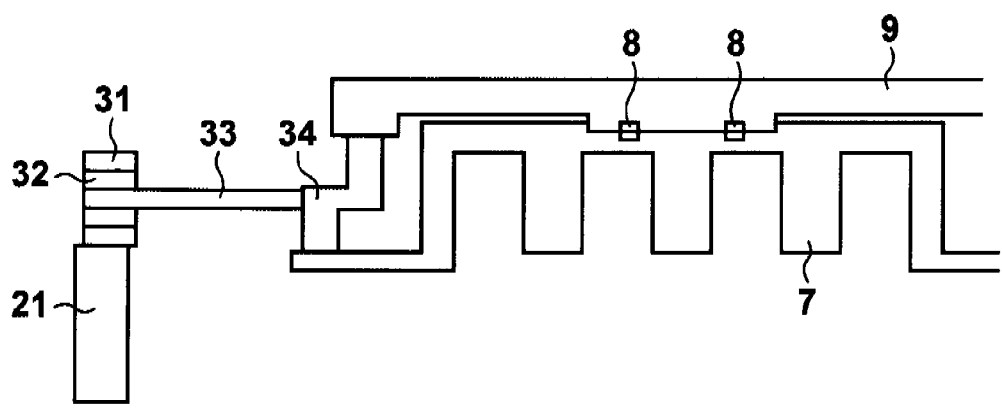
FIG. 4 is a schematic view of the document reading apparatus according to the embodiment when viewed from the feed roller side.

As shown in FIG. 3, the lower guide unit 2a further includes a conveying motor 17. The conveying motor 17 rotates the upstream-side conveying roller 11a and downstream-side conveying roller 12a in the document conveying direction D1 via a timing belt 18 and gears 19a and 19b. Note that a direction for rotating the conveying motor 17 in the document conveying direction D1 is defined as a normal direction (rotation), and a direction opposite to that direction is defined as a reverse direction (rotation). At the same time, a driving force is transmitted to a pickup driving unit 22 via the gear 19a and a gear 21. The pickup driving unit 22 includes a gear 31 which meshes with the gear 21, a one-way clutch 32, a shaft 33 which extends from the one-way clutch 32, and a cam member 34 attached to an end portion of the shaft 33, as shown in FIG. 4.

Figure 5:
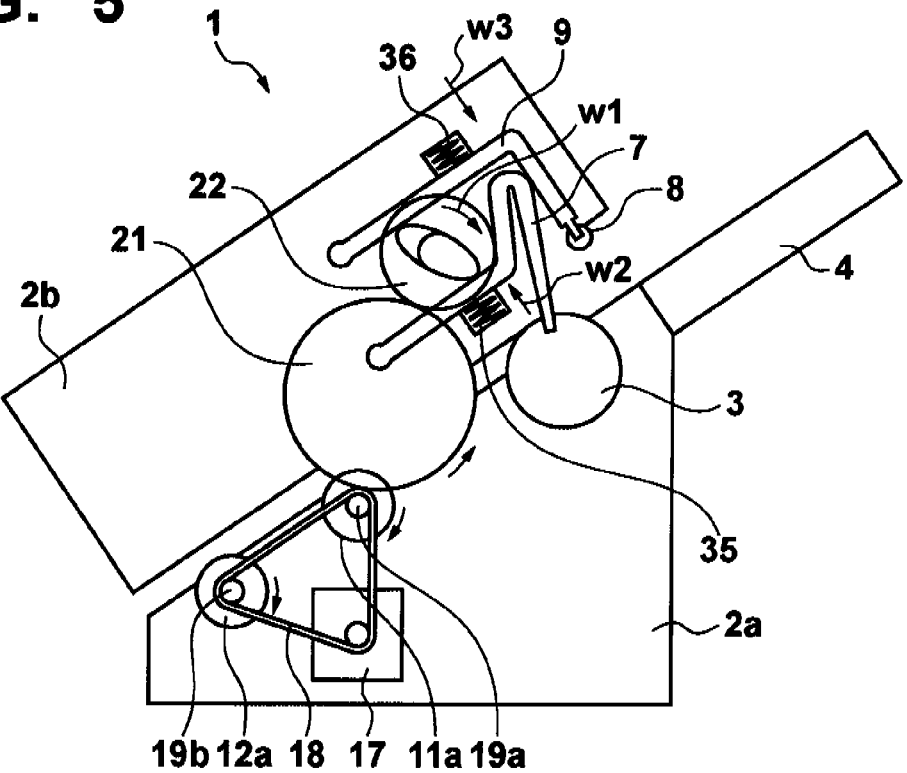
FIG. 5 is a side sectional view showing the arrangement when a conveying motor of the conveying driving system of the document reading apparatus according to the embodiment is rotated in a reverse direction.
Figure 6:
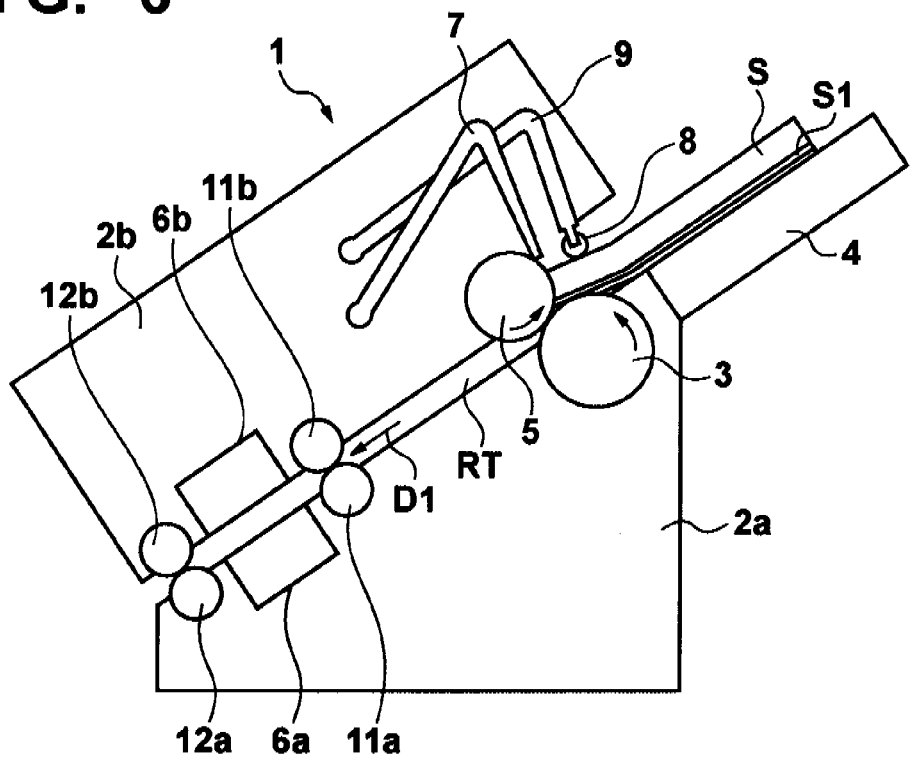
FIG. 6 is a side sectional view showing the arrangement around a feed roller in a feeding state of the document reading apparatus according to the embodiment.

As shown in FIG. 5, when the conveying motor 17 is rotated in the reverse direction, and the gear 31 is rotated in a direction of an arrow w1 via the gear 21, the one-way clutch 32 is locked to rotate the cam member 34 via the shaft 33. Then, the stopper 7 and pickup arm 9 are interlocked in directions opposite to arrows w2 and w3 due to the action of the cam member 34, so that the stopper 7 closes the conveying path RT (closed state) and the pickup arm 9 is retracted from the feed roller 3 (retracted state).

On the other hand, when the gear 31 is rotated in a direction opposite to the arrow w1 (when the conveying motor 17 is rotated in the normal direction), the one-way clutch 32 is unlocked so as not to transmit any driving force from the shaft 33 to the cam member 34. Thus, the stopper 7 and pickup arm 9 move in the directions of the arrows w2 and w3 by biasing forces of springs 35 and 36, respectively. Then, the stopper 7 opens the conveying path RT (open state), and the pickup arm 9 is brought into pressure-contact with the feed roller 3 (pressure-contact state), as shown in FIG. 3.

<Arrangement of Control System>

The arrangement of a control system of the document reading apparatus of this embodiment will be described below with reference to FIG. 10.

Figure 10:
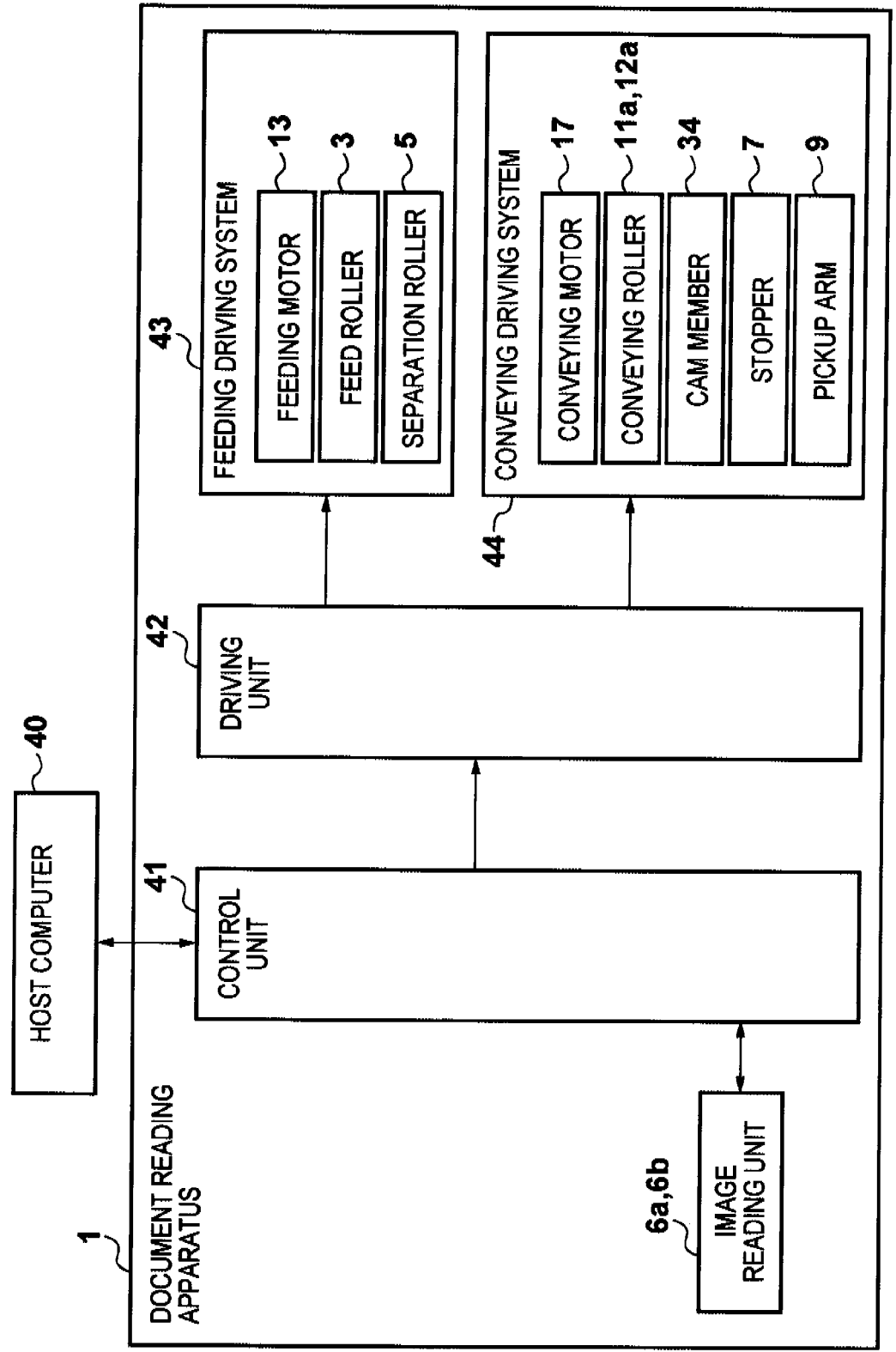
FIG. 10 is a block diagram showing the control arrangement of the document reading apparatus according to the embodiment.

Referring to FIG. 10, the document reading apparatus 1 mainly includes a control unit 41, driving unit 42, feeding driving system (an example of a feeding driving system) 43, conveying driving system (an example of a stopper driving system) 44, and the image reading units 6a and 6b. The control unit 41 timely outputs an operation instruction to the driving unit 42 in accordance with a control instruction from a host computer (to be referred to as a host hereinafter) 40 and an output from a document detection sensor (not shown). The feeding driving system 43 includes the feeding motor 13, and the feed roller 3 and separation roller 5, which are members to be driven via the belt and gears. The conveying driving system 44 includes the conveying motor 17, and the stopper 7, pickup arm 9, upstream-side conveying roller 11a, downstream-side conveying roller 12a, and cam member 34, which are members to be driven via the belt and gears.

<Operation>

The operation sequence of the document reading apparatus of this embodiment will be described below with reference to FIG. 6, FIGS. 7A to 7C, and FIGS. 11A and 11B.

Figure 7A:
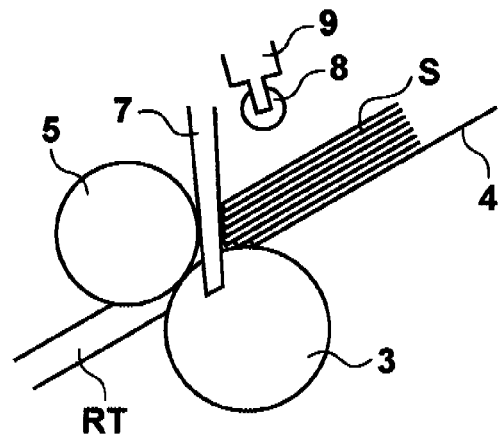
FIG. 7A is a side sectional view showing the arrangement around the feed roller in a document setting state of the document reading apparatus according to the embodiment.

In a standby state shown in FIG. 7A, the stopper 7 is held in a state in which it closes the conveying path RT (closed state), the pickup arm 9 is held in a state in which it is retracted from the feed roller 3, and the user sets the document bundle S on the feed tray 4 so that the leading end portion of the document bundle S abuts against the stopper 7.

A feed start operation from the state shown in FIG. 7A will be described below with reference to FIG. 11A.

Figure 11A:
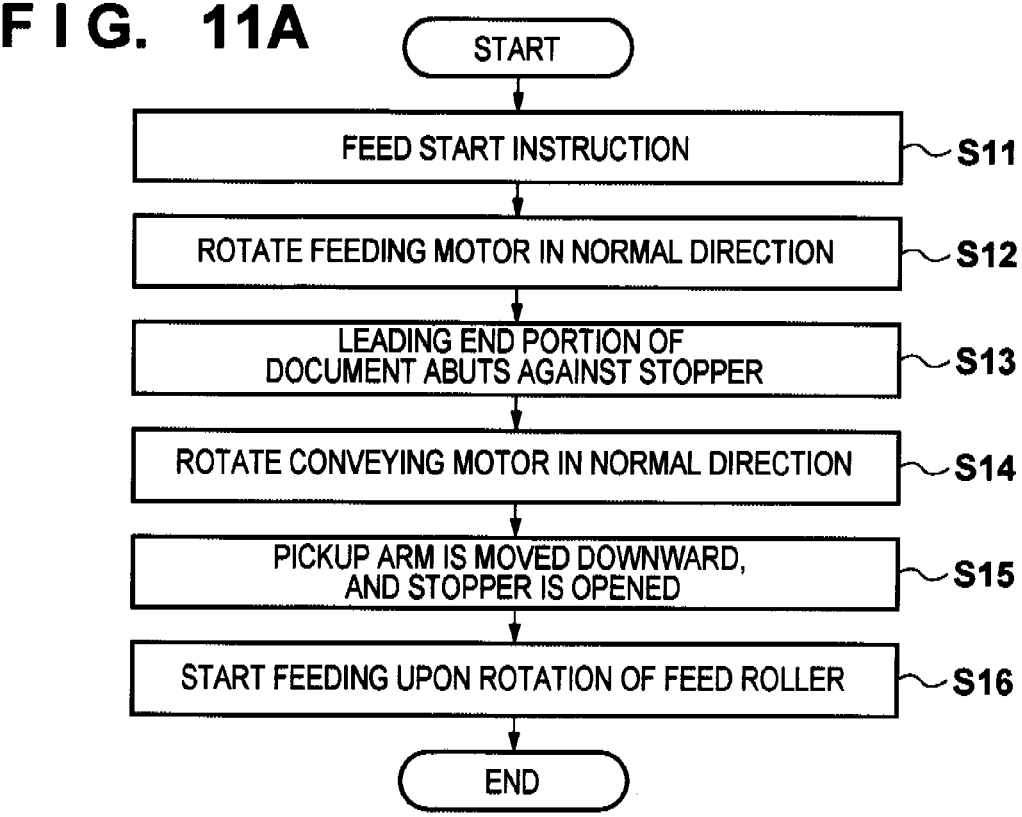
FIG. 11A is a flowchart showing the operation at a feed start timing of the document reading apparatus according to the embodiment.

In step S11 in FIG. 11A, upon reception of a feed start instruction from the host 40, the control unit 41 outputs an operation start instruction to the driving unit 42.

In step S12, the driving unit 42 rotates the feeding motor 13 in the normal direction.

Figure 7B:
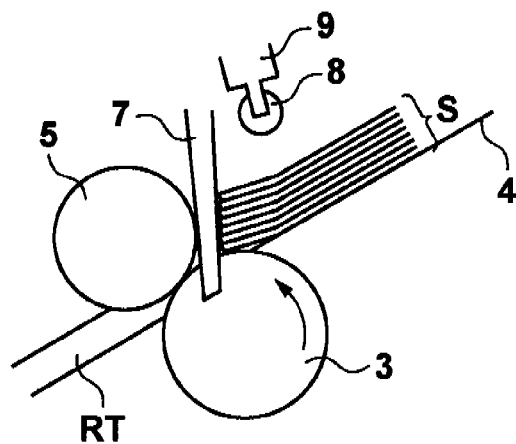
FIG. 7B is a side sectional view showing the arrangement around the feed roller in a document abutting operation state 1 of the document reading apparatus according to the embodiment.

In step S13, by rotating the feed roller 3 in the normal direction while the stopper 7 is in the closed state, as shown in FIG. 7B, a leading end portion of a lowermost sheet S1 of the document bundle S abuts against the stopper 7. This operation can forcibly suppress an inversely aligned state of documents.

In step S14, the driving unit 42 rotates the conveying motor 17 in the normal direction.

In step S15, while the feed roller 3 is rotated in the normal direction, the pickup arm 9 is moved downward and the stopper 7 is moved upward, thus setting an open state.

In step S16, the lowermost sheet S1 is picked up by the separation roller 5 upon rotation of the feed roller 3 in the normal direction, thus ending one feeding operation cycle.

A feed end operation will be described below with reference to FIG. 11B.

Figure 11B:
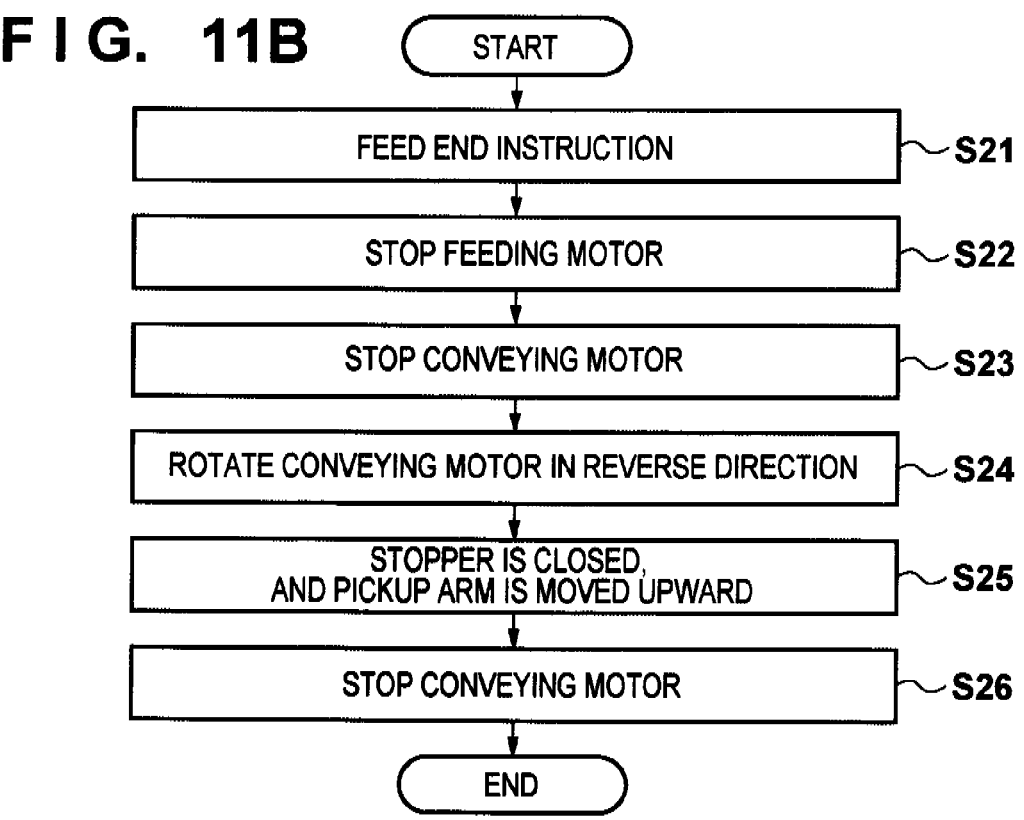
FIG. 11B is a flowchart showing the operation at a feed end timing of the document reading apparatus according to the embodiment.

In step S21 in FIG. 11B, upon reception of a feed end instruction from the host 40, the control unit 41 outputs an operation end instruction to the driving unit 42.

In step S22, the driving unit 42 stops the feeding motor 13.

In step S23, the driving unit 42 stops the conveying motor 17.

In step S24, the driving unit 42 rotates the conveying motor 17 in the reverse direction through a predetermined angle. Note that letting L1 be an arc length of the exposed surface of the feed roller 3 to the conveying path RT and L2 be a full length of the outer surface of the feed roller 3, the predetermined angle is set to be at least L1/L2 (the predetermined angle is set to be about ½5 rotations at minimum although it changes depending on a roller diameter). Thus, the leading end portion of the document bundle S can be aligned.

In step S25, the stopper 7 is set in the closed state, and the pickup arm 9 is set in the retracted state by rotating the conveying motor 17 in the reverse direction, as shown in FIG. 5.

In step S26, the driving unit 42 stops the conveying motor 17, thus ending the processing.

Figure 7C:
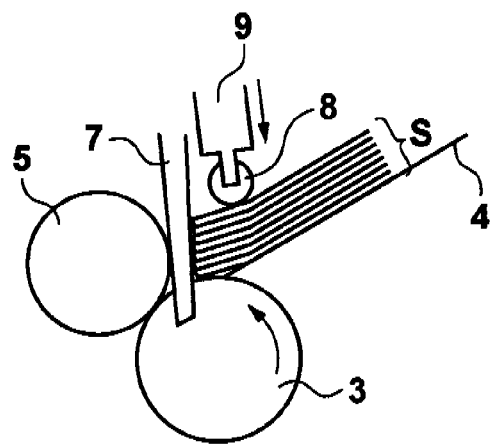
FIG. 7C is a side sectional view showing the arrangement around the feed roller in a document abutting operation state 2 of the document reading apparatus according to the embodiment.
Figure 12A:
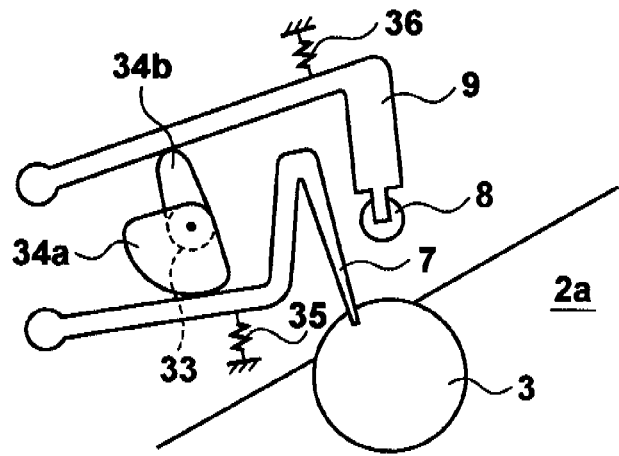
FIG. 12A is a side sectional view showing the arrangement around the feed roller in a document setting state of the document reading apparatus according to a modification of the embodiment.
Figure 12B:
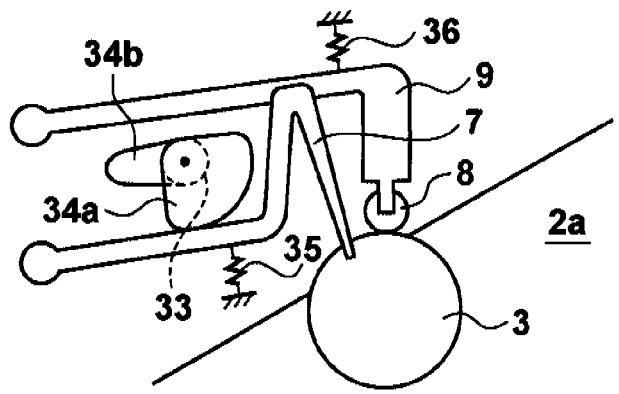
FIG. 12B is a side sectional view showing the arrangement around the feed roller in a document abutting operation state of the document reading apparatus according to the modification of the embodiment.
Figure 12C:
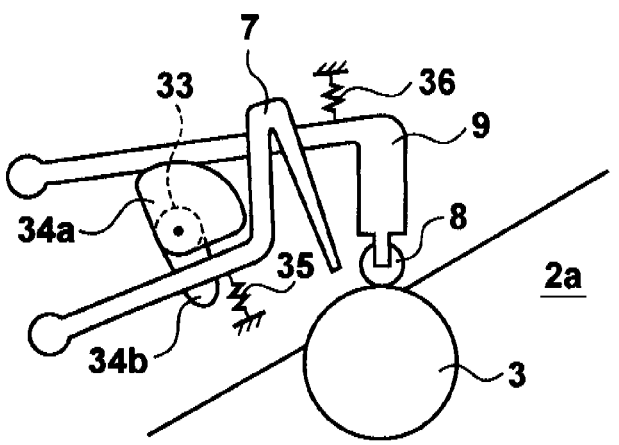
FIG. 12C is a side sectional view showing the arrangement around the feed roller in a feeding state of the document reading apparatus according to the modification of the embodiment.

In the document abutting operation, the pickup arm 9 is retracted from the document bundle S, as shown in FIG. 7B. Alternatively, the pickup arm 9 may be moved downward toward the feed roller 3 side to press the document bundle S against the feed roller 3, as shown in FIG. 7C. With this arrangement, a relative slippage between the feed roller 3 and lowermost sheet S1 is reduced, and the abutting precision of the document bundle S against the pickup arm 9 (a suppression effect of the inversely aligned state) is improved. However, in order to realize the operation shown in FIG. 7C, a cam profile of the cam member 34 has to be adjusted so that the pickup arm 9 is brought into pressure-contact with the document bundle S before the stopper 7 begins to move. FIGS. 12A to 12C exemplify the cam member 34, the cam profile of which is adjusted to realize the operation shown in FIG. 7C.

In a standby state shown in FIG. 12A, a first profile portion 34a of the cam member 34 pushes down the stopper 7 against a biasing force of the spring 35 in the direction w2 to set it in the closed state. On the other hand, a second profile portion 34b pushes up the pickup arm 9 against a biasing force of the spring 36 in the direction w3 to set it in the retracted state.

Next, in a document abutting operation state shown in FIG. 12B, the first profile portion 34a pushes down the stopper 7 to keep it in the closed state, and the second profile portion 34b is retracted to set the pickup arm 9 in the pressure-contact state.

In a feeding state shown in FIG. 12C, the first profile portion 34a is retracted to set the stopper 7 in the open state, and the second profile portion 34b is retracted to set the pickup arm 9 in the pressure-contact state.

The document abutting operation shown in FIGS. 12A to 12C will be described below with reference to FIG. 5, FIGS. 7A to 7C, and FIG. 13.

In the standby state shown in FIG. 7A, the stopper 7 is held in a state in which it closes the conveying path RT (closed state), and the pickup arm 9 is held in a state in which it is retracted from the feed roller 3 (the state of the cam member 34 is as shown in FIG. 12A). In this state, the user sets the document bundle S on the feed tray 4, so that the leading end portion of the document bundle S abuts against the stopper 7.

In step S31 in FIG. 13, upon reception of a feed start instruction from the host 40, the control unit 41 outputs an operation start instruction to the driving unit 42.

In step S32, the driving unit 42 rotates the conveying motor 17 in the normal direction through the predetermined angle. In this case, the cam member 34 is rotated in a direction opposite to the direction w1 shown in FIG. 5.

In step S33, the driving unit 42 stops the conveying motor 17. In this case, the cam member 34 is set in the state shown in FIG. 12B.

In step S34, the driving unit 42 rotates the feeding motor 13 in the normal direction.

In step S35, by rotating the feed roller 3 in the normal direction while the stopper 7 is kept in the closed state, as shown in FIG. 7C, the leading end portion of the lowermost sheet S1 of the document bundle S abuts against the stopper 7.

In step S36, the driving unit 42 rotates the conveying motor 17 in the normal direction. In this case, the cam member 34 is rotated in a direction opposite to the direction w1 shown in FIG. 5.

In step S37, while the feed roller 3 is rotated, the cam member 34 is set in the state shown in FIG. 12C, thus moving the pickup arm 9 downward, and opening the stopper 7.

In step S38, the lowermost sheet S1 is picked up by the separation roller 5 as a result of the rotation of the feed roller 3 in the normal direction, thus ending one feeding operation cycle.

Figure 8A:
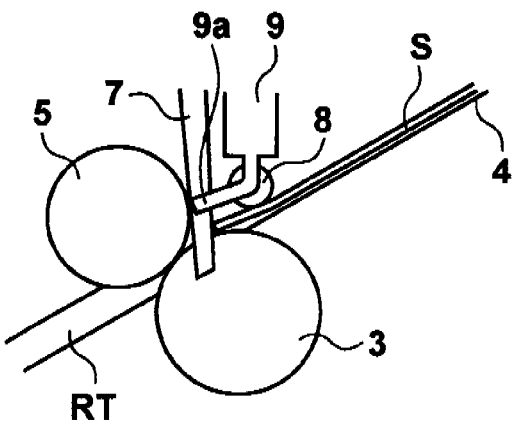
FIG. 8A is a side sectional view showing the arrangement around the feed roller in a document abutting operation state of the document reading apparatus according to the embodiment.
Figure 8B:
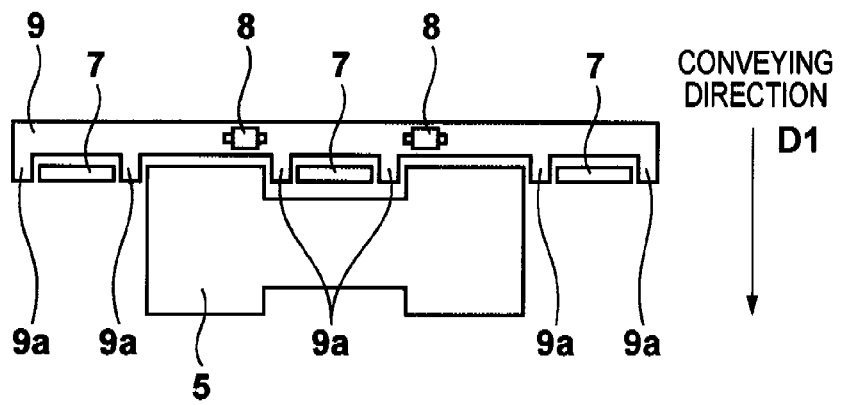
FIG. 8B is a schematic view of the document abutting operation state of the document reading apparatus according to the embodiment when viewed from the feed roller side.
Figure 8C:
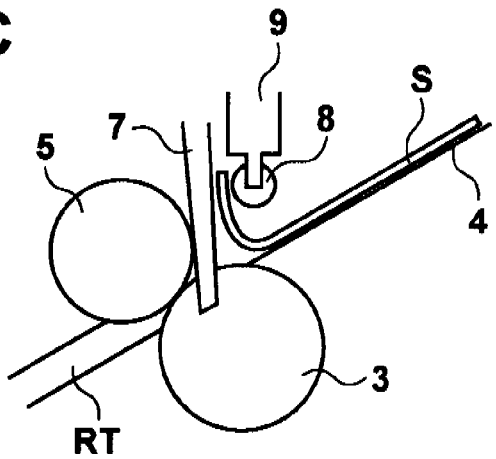
FIG. 8C is a side sectional view around the feed roller to show a state in which a document enters a gap between a stopper and pickup roller by the document abutting operation of the document reading apparatus according to the embodiment.
Figure 9:
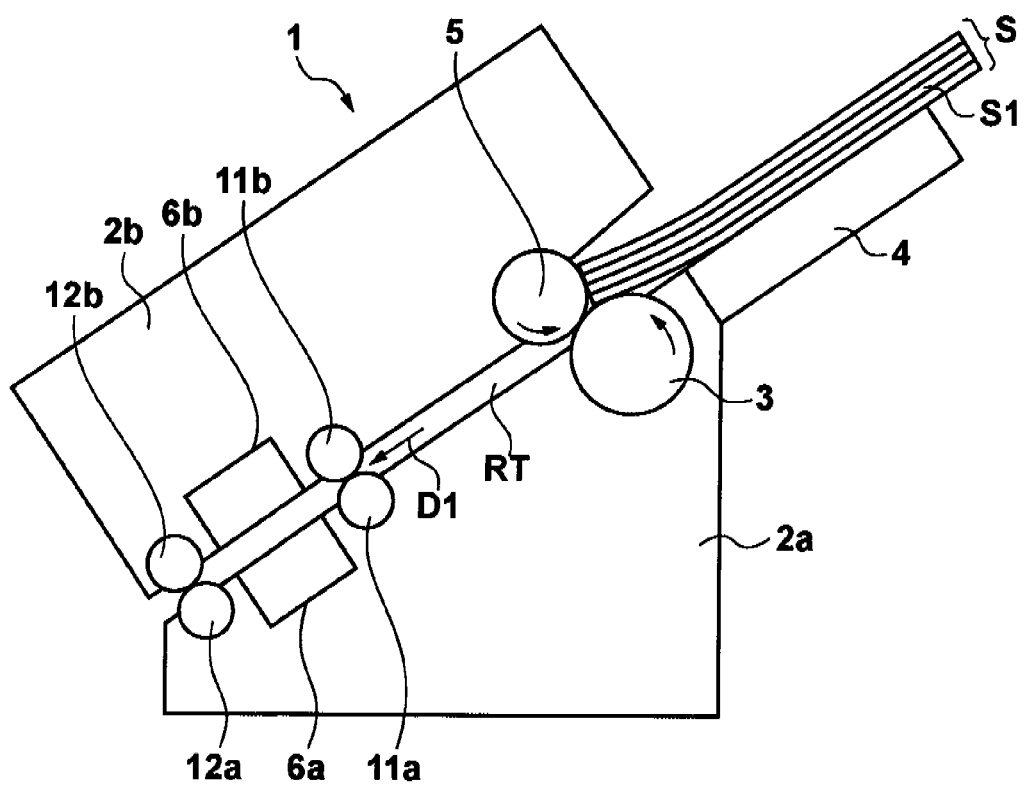
FIG. 9 is a schematic side sectional view showing the arrangement of a conventional document reading apparatus.

On the pickup arm 9, as shown in FIG. 8A to 8C, a rib-shaped portion 9a projects in a direction perpendicular to a document abutting surface as a side surface of a document abutting portion of the stopper 7. The rib-shaped portion 9a is arranged to prevent a phenomenon in which when one document to be fed is placed on the feed tray 4, the document which abuts against the stopper 7 is lifted up to enter a gap between the stopper 7 and pickup roller 8 in the document abutting operation, as shown in FIG. 8C.

Second Embodiment

A document reading apparatus according to the second embodiment of the present invention will be described below.

<Arrangement of Apparatus>

Figure 14:
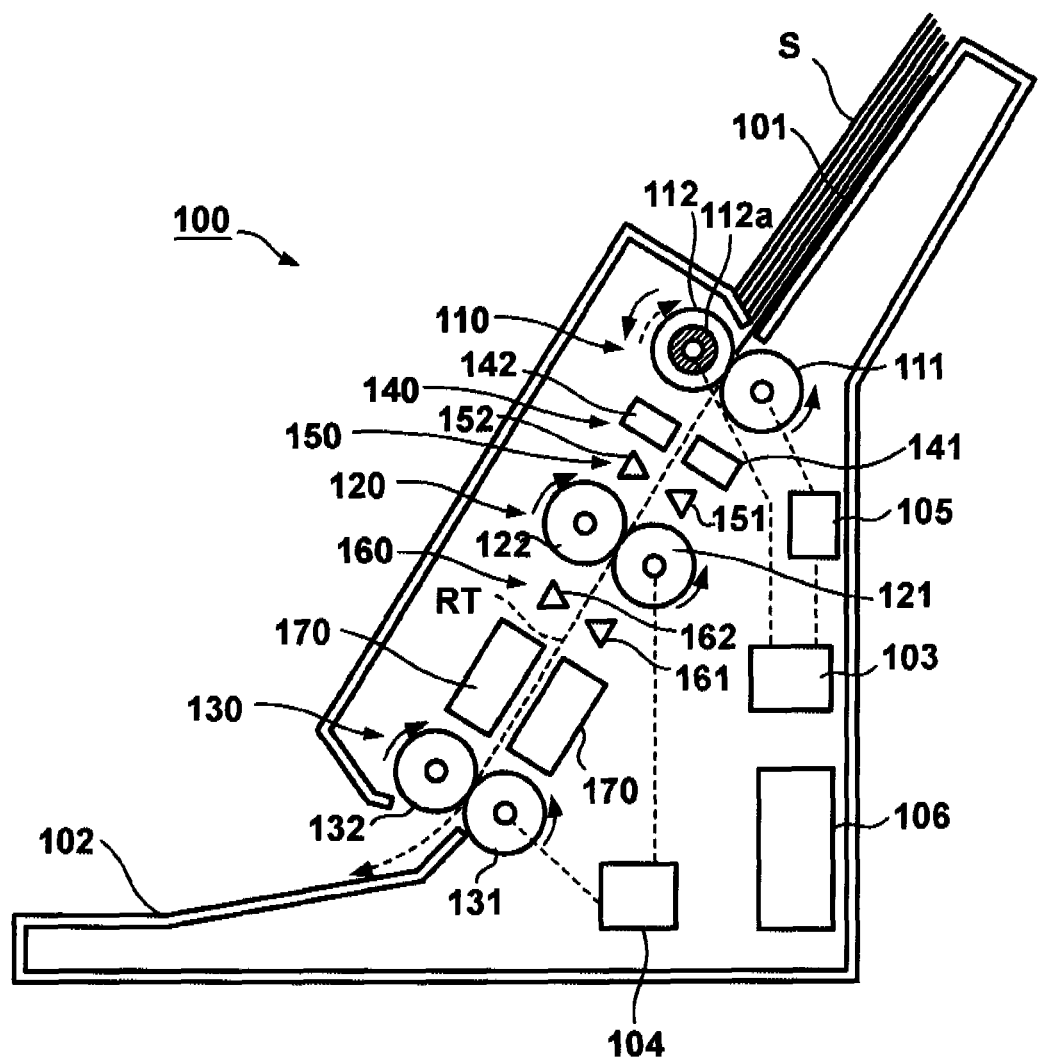
FIG. 14 is a schematic side sectional view showing the arrangement of a document reading apparatus according to the second embodiment.

Referring to FIG. 14, a document reading apparatus 100 picks up a plurality of sheets S (document bundle) placed on a document tray 101 one by one, reads images on a picked-up sheet while conveying the sheet along a conveying path RT in the apparatus, and discharges that sheet on a discharge tray 102.

A first conveying unit 110 as a feeding means which feeds a sheet onto the conveying path RT includes a feed roller 111 and separation roller 112, and sequentially conveys sheets S on the document tray 101 one by one. A driving force is transmitted from a driving unit 103 such as a motor to the feed roller 111 via a transmission unit 105, thereby rotating the feed roller 111 in a direction of an arrow. The transmission unit 105 is, for example, an electromagnetic clutch, and connects/disconnects the driving force from the driving unit 103 to the feed roller 111.

Normally, the transmission unit 105 sets a state in which the driving force is transmitted. When the sheet S is to be conveyed in a reverse direction, as will be described later, the transmission unit 105 disconnects the driving force. When transmission of the driving force is disconnected by the transmission unit 105, the feed roller 111 is set in a freely rotatable state.

The separation roller 112 is used to separate the sheets S one by one, and is in pressure-contact with the feed roller 111 at a given pressure. In order to assure this pressure-contact state, it is desirable to arrange the separation roller 112 to be swingable, and to bias the roller 112 against the feed roller 111. The driving force from the driving unit 103 is transmitted to the separation roller 112 via a torque limiter 112a, and the separation roller 112 is rotated in a direction of a solid arrow. Since the driving force transmitted to the separation roller 112 is limited by the torque limiter 112a, the separation roller 112 is rotated in a direction to be rotated by the feed roller 111 (in a direction of a broken arrow) when it contacts the feed roller 111. In this way, when the plurality of sheets S are conveyed to a nip between the feed roller 111 and separation roller 112, they are stopped to prevent two or more sheets S from being conveyed downstream while leaving one sheet.

Note that the separation roller 112 and feed roller 111 configure a separation mechanism in this embodiment. However, such separation mechanism need not always be arranged, and a feeding mechanism which feeds sheets S one by one onto the conveying path RT need only be arranged.

A second conveying unit 120 as a conveying means includes a driving roller 121 and driven roller 122. The second conveying unit 120 is arranged on the downstream side of the first conveying unit 110, and conveys the sheet S conveyed from the first conveying unit 110 to its downstream side. A driving force from a driving unit 104 such as a motor is transmitted to the driving roller 121, which is rotated in a direction of an arrow. The driven roller 122 is in pressure-contact with the driving roller 121 at a given pressure, and is rotated by the driving roller 121.

A third conveying unit 130 includes a driving roller 131 and driven roller 132. The third conveying unit 130 is arranged on the downstream side of the second conveying unit 110, and conveys the sheet S conveyed from the second conveying unit 120 toward the discharge tray 102. A driving force from the driving unit 104 such as a motor is transmitted to the driving roller 131, which is rotated in a direction of an arrow. The driven roller 132 is in pressure-contact with the driving roller 131, and is rotated by the driving roller 131.

In this embodiment, the second and third conveying units 120 and 130 convey the sheet S at a constant speed for the purpose of reading operations of image reading units 170.

The conveying speed of these units is always set to be that of the first conveying unit 110 to reliably avoid a situation in which a succeeding sheet catches up a preceding sheet. Hence, this embodiment executes speed control so that the conveying speed of the sheet S by the second and third conveying units 120 and 130 is higher than that of the first conveying unit 110.

Note that even when the conveying speed of the sheet S by the second and third conveying units 120 and 130 is set to be equal to that by the first conveying unit 110, a feed start timing of the succeeding sheet S is intermittently shifted, thus forming a minimum sheet interval between the preceding and succeeding sheets.

A multi-feed detection sensor 140 is arranged between the first and second conveying units 110 and 120, and is an example of a detection sensor (means for detecting a sheet behavior and state) for detecting multi-fed sheets S, which are in tight contact with each other due to static electricity or the like, and are passed (multi-fed) through the first conveying unit 110. As the multi-feed detection sensor 140, various sensors are available. In this embodiment, an ultrasonic sensor is used as the multi-feed detection sensor 140. The multi-feed detection sensor 140 includes a transmitting unit 141 and receiving unit 142, and detects multi-feeding of sheets based on a principle that attenuation amounts of ultrasonic waves transmitted through a sheet or sheets S are different between the multi-fed sheets S and a sheet conveyed one by one.

A position detection sensor 150 is an example of an upstream-side detection sensor (means for detecting a sheet behavior and state), which is disposed on the upstream side of the second conveying unit 120 and on the downstream side of the first conveying unit 110. The position detection sensor 150 detects the position of the sheet S conveyed by the first conveying unit 110. More specifically, the position detection sensor 150 detects whether or not the end portion of the sheet has arrived or passed its detection position. As the position detection sensor 150, various sensors are available. In this embodiment, an optical sensor is used as the position detection sensor 150. The position detection sensor 150 includes a light-emitting unit 151 and light-receiving unit 152, and detects the sheet S based on a principle that a received light intensity (received light amount) changes due to arrival or passage of the sheet S.

In this embodiment, the position detection sensor 150 is arranged in the vicinity of and on the downstream side of the multi-feed detection sensor 140, so that when the leading end of the sheet S is detected by the position detection sensor 150, the sheet S reaches a multi-feeding detectable position of the multi-feed detection sensor 140. Note that the position detection sensor 150 is not limited to the optical sensor. For example, a sensor (image sensor or the like) which can detect the end portion of the sheet S may be used.

A position detection sensor 160 is an example of a downstream-side detection sensor, which is disposed on the upstream side of the image reading units 170 and on the downstream side of the second conveying unit 120. The position detection sensor 160 detects the position of the sheet S conveyed by the second conveying unit 120. As the position detection sensor 160, various sensors are available. In this embodiment, an optical sensor is used as the position detection sensor 160 as in the position detection sensor 150. The position detection sensor 160 includes a light-emitting unit 161 and light-receiving unit 162, and detects the sheet S based on a principle that a received light intensity (received light amount) changes due to arrival or passage of the sheet S.

In this embodiment, the image reading units 170 are respectively disposed on the two sides of the conveying path RT, and read images on obverse and reverse faces of the sheet S. However, only one image reading unit 170 may be disposed on one side of the conveying path RT to read an image on only one face of the sheet S.

A control unit 106 is an electric circuit which includes, for example, a processor such as a CPU, a storage unit such as a ROM and RAM, and an interface which interfaces between the processor and an external device. The control unit 106 acquires the detection results of the multi-feed detection sensor 140 and position detection sensor 160 and image data read by the image reading units 170 from these sensors and units. Also, the control unit 106 controls the driving units 103 and 104 and the transmission unit 105.

Control Example

A basic operation of the document reading apparatus 100 will be described below. Upon reception of a document reading start instruction from, for example, an external personal computer to which the document reading apparatus 100 is connected, the control unit 106 starts driving of the first to third conveying units 110 to 130. A plurality of sheets S stacked on the document tray 101 are conveyed one by one in turn from a lowermost sheet S.

During conveyance, the sheet S undergoes multi-feed detection of the multi-feed detection sensor 140. If it is determined that no multi-feeding is made, the conveyance is continued. The control unit 106 starts image reading operations by the image reading units 170 for the sheet S, which is conveyed by the second conveying unit 120, at a timing based on the detection result of the position detection sensor 160. The control unit 106 temporarily stores the read images, and sequentially transmits them to the external personal computer. The sheet S from which the images have been read is discharged onto the discharge tray 102 by the third conveying unit 130, thus ending the image reading processing of that sheet S.

Figure 15:
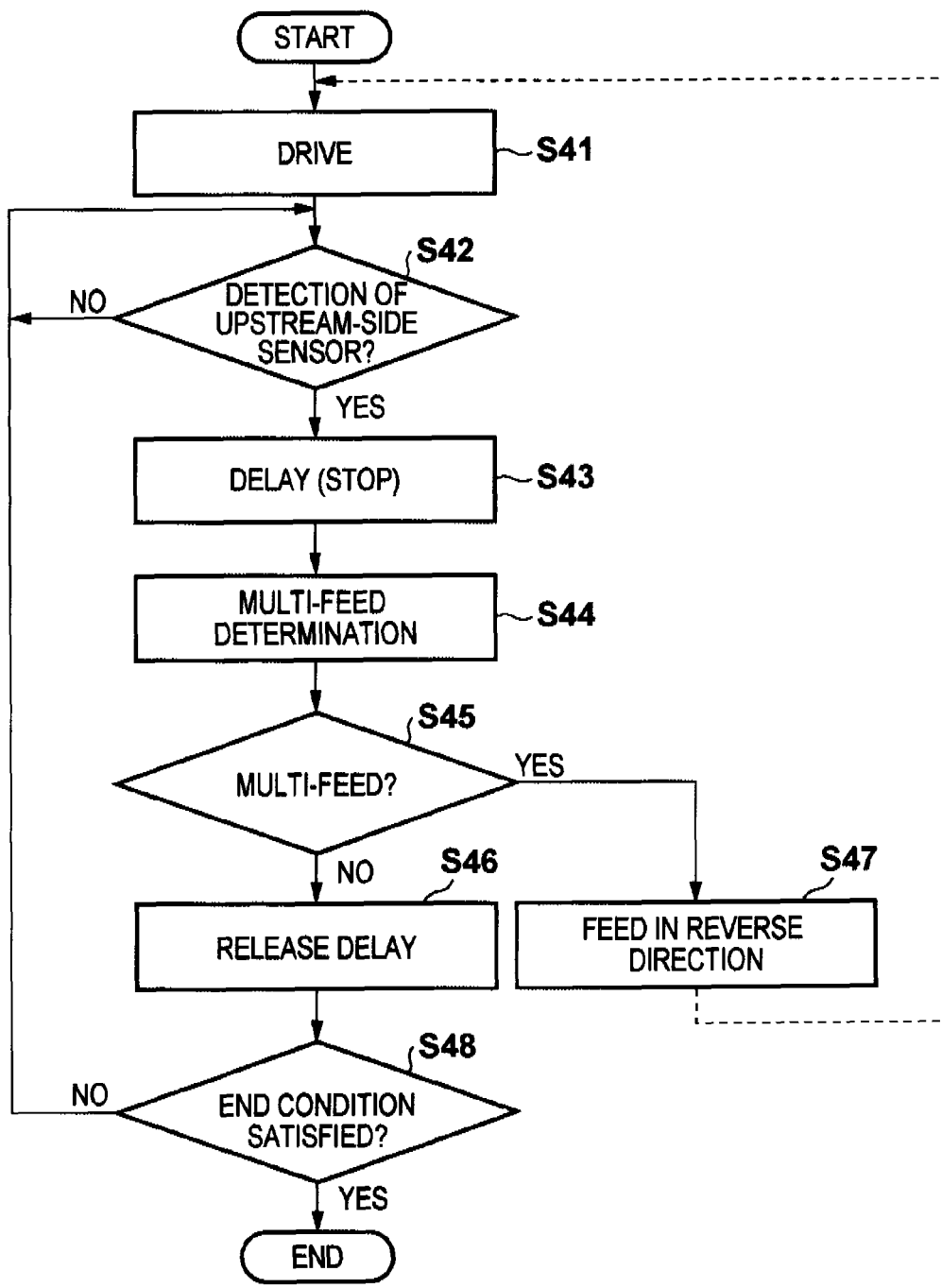
FIG. 15 is a flowchart showing a conveying operation of a first conveying unit.

Practical processing by the control unit 106 associated with the conveyance of the sheet S by the first conveying unit 110 will be described below with reference to FIG. 15. FIG. 15 is a flowchart of conveyance control of the first conveying unit 110.

Upon reception of a document reading start instruction from the external personal computer, the control unit 106 starts the processing shown in FIG. 15. In step S41, the control unit 106 drives the driving unit 103 to rotate the feed roller 111 and separation roller 112. The control unit 106 sets the transmission unit 105 in a driving force transmission state. Then, a sheet S on the document tray 101 is conveyed into the apparatus (conveying path RT). The control unit 106 determines in step S42 whether or not the upstream-side position detection sensor 150 on the conveying path RT detects the leading end of the sheet S (whether or not the detection changes from non-detection→detection). If Yes in step S42, the process advances to step S43; otherwise, the control unit 106 waits until the sheet S is detected. Note that the document reading apparatus 100 and external personal computer may be connected via a USB connection or network. Also, the present invention is not limited to remote control of the document reading apparatus 100 from the external personal computer. For example, the document reading apparatus 100 may include a server function or user interface control function, may execute its operation control based on a direct operation on itself, and may output read image data to a predetermined destination (for example, a personal computer).

In step S43, the control unit 106 controls the first conveying unit 110 to temporarily delay the conveyance of the sheet so that the sheet does not reach the second conveying unit 120 before completion of multi-feed determination. In this embodiment, the control unit 106 stops the driving unit 103 to temporarily stop the conveyance. Alternatively, the conveying speed may be decreased to delay the conveyance. In step S44, the control unit 106 acquires the detection result of the multi-feed detection sensor 140 to determine whether or not multi-feeding has occurred. If the control unit 106 determines that multi-feeding has occurred, the process advances to step S47; otherwise, the process advances to step S46. In this manner, in this embodiment, multi-feed detection by the multi-feed detection sensor 140 is executed based on the detection result of the sheet S.

In step S46, the control unit 106 restores the conveying speed of the first conveying unit 110, which is set in the delay state in step S43. That is, the control unit 106 restarts temporarily stopped feeding of the sheet S. Note that restarting feeding of the sheet S means that the control unit 106 executes stop or deceleration control of the feeding operation of the first conveying unit 110 based on the detection result of the position detection sensor 150, and then executes restart or re-acceleration control. In this case, the restart or re-acceleration control of the feeding operation by the control unit 106 means to restart the feeding operation from the stopped or decelerated state at a predetermined speed. Note that when the example of delaying the feeding operation by decreasing the conveying speed (feeding speed) is adopted, the conveying speed (feeding speed) is restored to the original speed.

In step S47, since multi-feeding has occurred, the control unit 106 executes processing for feeding the sheets S to the document tray 101 in the reverse direction. In this case, after the transmission unit 105 disconnects the driving force transmission from the driving unit 103 to the feed roller 111, the driving unit 103 is driven. Then, the separation roller 112 is rotated in a direction of a solid arrow in FIG. 14, and the feed roller 111 is rotated by the separation roller 112, thus returning the sheet S to the document tray 101.

Note that in this embodiment, the feed roller 111 and separation roller 112 commonly use the driving unit 103. Alternatively, driving units for these rollers may be independently arranged. In this case, the need for the transmission unit 105 is obviated. As a process after the process in step S47 is executed for a predetermined time period, the process may return to step S41 to restart the reading operations, or the conveyance may be stopped to generate an error message or the like.

The control unit 106 determines in step S48 whether or not an end condition is satisfied. The end condition includes a case in which a reading end instruction is received from the external personal computer, and a case in which all the sheets S on the document tray 101 have been read (for example, the position detection sensor 150 has not been changed to a detection state for a predetermined period of time). If the end condition is not satisfied, the process returns to step S42; otherwise, the conveyance is stopped, thus ending the processes as one unit.

In this embodiment, with the processes in steps S43 to S46, the sheet S does not reach the second conveying unit 120 before the multi-feed determination of the sheet S is complete. For this reason, when the multi-feeding has occurred to execute the reverse feeding process in step S47, a situation in which the second conveying unit 120 clips the sheets S can be avoided, thus facilitating discharging of the multi-fed sheets S. Since the control that prevents the sheet S from reaching the second conveying unit 120 is to temporarily delay the conveyance by the first conveying unit 110, the conveyance efficiency can be enhanced compared to a case in which the sheet is always conveyed at a low speed.

Also, upon execution of the control of the first conveying unit 110, since no conveyance stop/restart control using the detection result of the downstream-side position detection sensor 160 is executed, the conveyance efficiency can be improved upon successively reading the sheets S. This point will be described below with reference to FIGS. 16 and 17. A conventional method shown in FIG. 17 will be described first as a comparative example. The conventional method does not include any component corresponding to the upstream-side position detection sensor 150, and starts conveyance of a succeeding sheet S after passage of a preceding sheet S is confirmed by the downstream-side position detection sensor 160.

Figure 17:
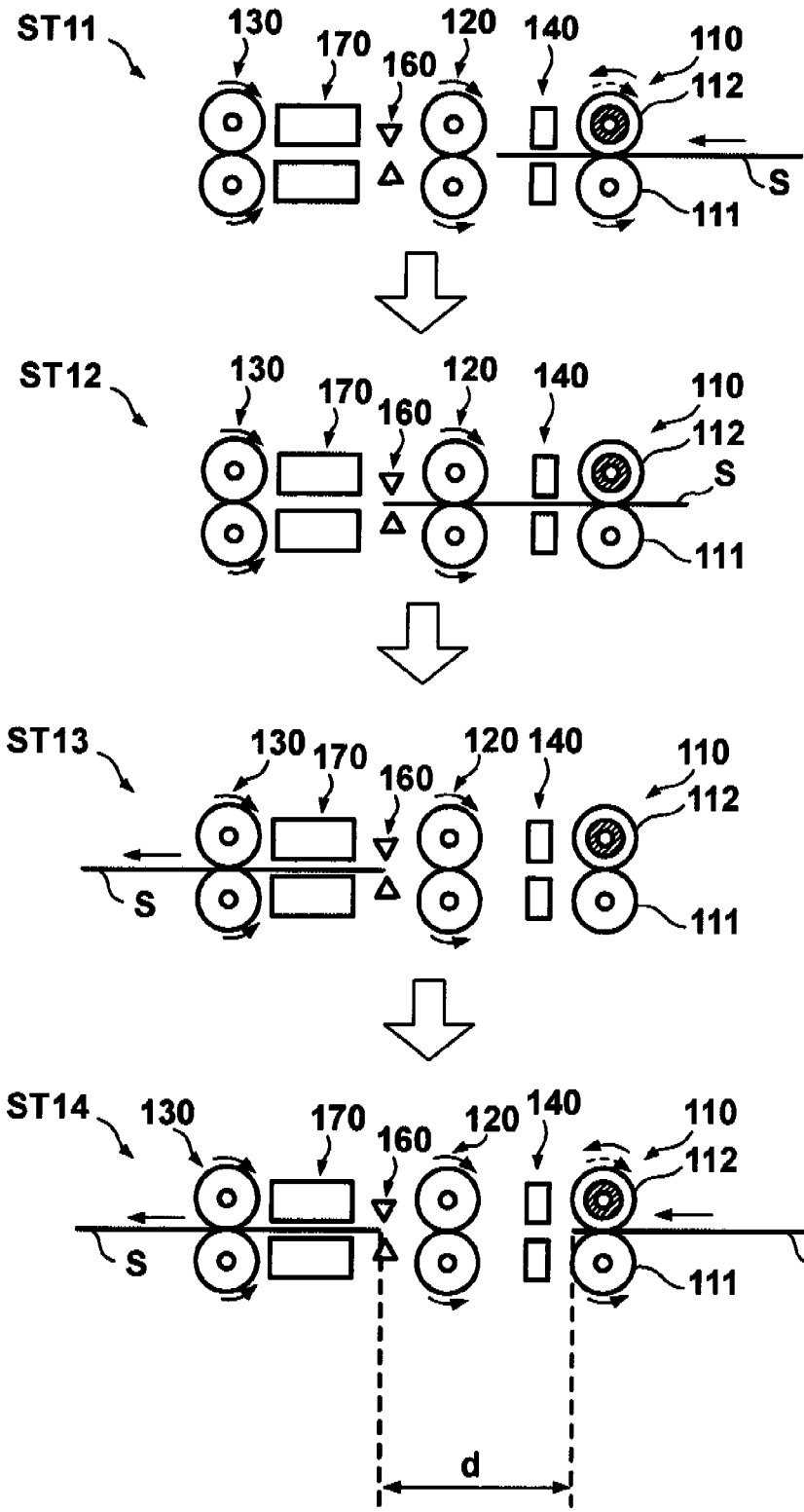
FIG. 17 shows an example of conventional conveying control.

In a state ST11 in FIG. 17, a sheet S is conveyed from the document tray 101 by the first conveying unit 110. This conveyance continues until the leading end of the sheet S is detected by the position detection sensor 160, as shown in a state ST12. When the leading end of the sheet S is detected, the conveyance of the first conveying unit 110 is stopped.

When the trailing end of the sheet S is detected as result of conveyance by the second and third conveying units 120 and 130, as shown in a state ST13, the conveyance of the next sheet S from the first conveying unit 110 is started from the document tray 101, as shown in a state ST14. A conveyance interval between the preceding and succeeding sheets S is an interval d corresponding to a distance between the first conveying unit 110 and position detection sensor 160.

Figure 16:
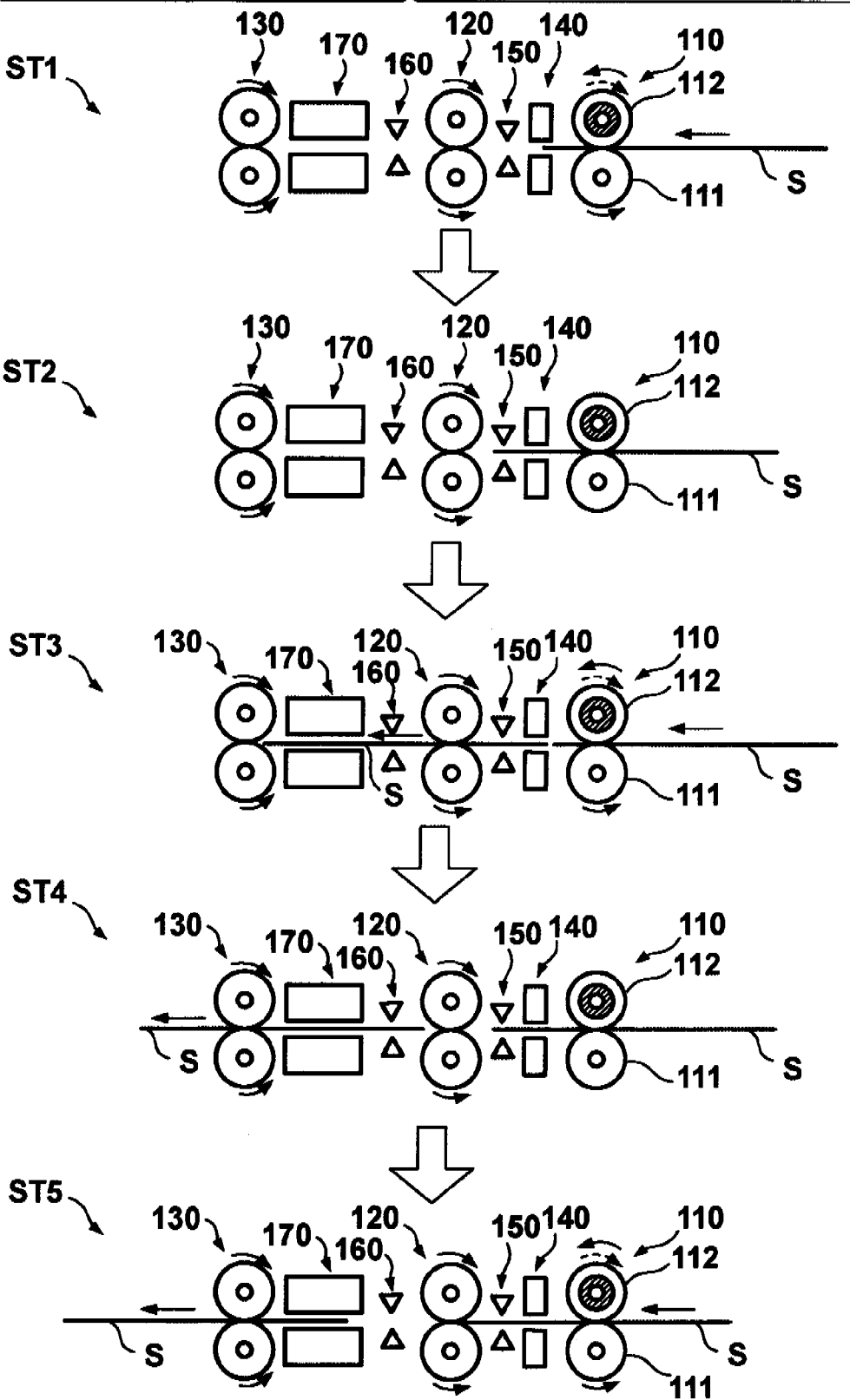
FIG. 16 shows an example of the conveying operation according to the embodiment.

The case of this embodiment will be described below with reference to FIG. 16. Note that in the example shown in FIG. 16, the conveyance of the first conveying unit 110 is temporarily delayed by temporarily stopping the conveyance as in the flowchart shown in FIG. 15.

In a state ST1, a sheet S is conveyed from the document tray 101 by the first conveying unit 110. This conveyance continues until the leading end of the sheet S is detected by the position detection sensor 150, as shown in a state ST2. When the leading end of the sheet S is detected, the conveyance of the first conveying unit 110 is temporarily stopped to execute the multi-feed determination. When the multi-feed determination result is OK, the conveyance (feeding) by the first conveying unit 110 is restarted, and continues until the leading end of the succeeding sheet S is detected by the position detection sensor 150.

For this reason, as shown in a state ST3, the succeeding sheet S can be conveyed with a little conveyance interval from the preceding sheet S. In a state ST4, the leading end of the succeeding sheet S is detected by the position detection sensor 150, and the conveying operation by the first conveying unit 110 is temporarily stopped. At this time, a conveyance interval is generated between the preceding and succeeding sheets S. In a state ST5, the multi-feed determination result of the succeeding sheet S is OK (no multi-feeding), and the conveyance by the first conveying unit 110 is restarted. That is, in the states ST3 and ST4, the control unit 106 executes restart (re-acceleration) control of the feeding operation by means of the first conveying unit 110 based on the detection result of the position detection sensor 150, thereby controlling to transfer the conveyed sheet from the first conveying unit 110 to the second conveying unit 120.

Note that such conveyed sheet transfer control may be executed based on not only the detection result of the position detection sensor 150 but also that of the multi-feed detection sensor 140. For example, when the multi-feed detection sensor 140 judges no sheet multi-feeding, the feeding restart control of the first conveying unit 110 or the sheet transfer control from the first conveying unit 110 to the second conveying unit 120 can be executed.

In either case, the sheets S can be continuously and efficiently conveyed to the downstream side by the sheet transfer timing control. Such sheet interval can be generated with high reproducibility by repetitively controlling stopping or deceleration and subsequent re-acceleration of the feeding operation by the first conveying unit 110 by the control unit 106.

Note that when the sheet interval is adjusted as needed, for example, when a sufficient sheet interval between the preceding and succeeding sheets S is to be assured, the control unit 106 desirably controls the sheet conveying speed by the second conveying unit 120 to be higher than the feeding speed (conveying speed) by the first conveying unit 110. By completely separating the opposing end portions of the two successive sheets based on a conveying speed difference between the preceding and succeeding sheets S, the position detection sensor 150 can surely and precisely detect arrival of the end portion of the succeeding sheet S, and a required sheet interval (for example, a minimum interval required for image reading operations) can then be efficiently formed with high controllability by adjusting the restart timing of the feeding operation by the first conveying unit 110.

As described above, in this embodiment, the conveyance interval between the preceding and succeeding sheets S becomes shorter than the interval d corresponding to the distance between the first conveying unit 110 and position detection sensor 160, thus enhancing the sheet conveyance efficiency.

In this embodiment, the sheet multi-feed determination is executed in a state in which the conveying operation by the first conveying unit 110 is temporarily stopped. For the multi-feed determination by the multi-feed detection sensor 140 such as an ultrasonic sensor, a predetermined time period (for example, about several ten msec) is preferable. On the other hand, in order to increase the number of sheets to be processed, when the sheet interval is decreased or the conveying speed is increased, the detection precision of the sheet multi-feed determination may lower. For this reason, when the sheet multi-feed determination is executed while the feeding operation (conveying operation) by the first conveying unit 110 is temporarily stopped, the high detection precision of the multi-feed determination can be assured while enhancing the sheet conveyance efficiency. Note that the multi-feed determination may be executed while the feeding operation by the first conveying unit 110 is decelerated.

Third Embodiment

Figure 18A:
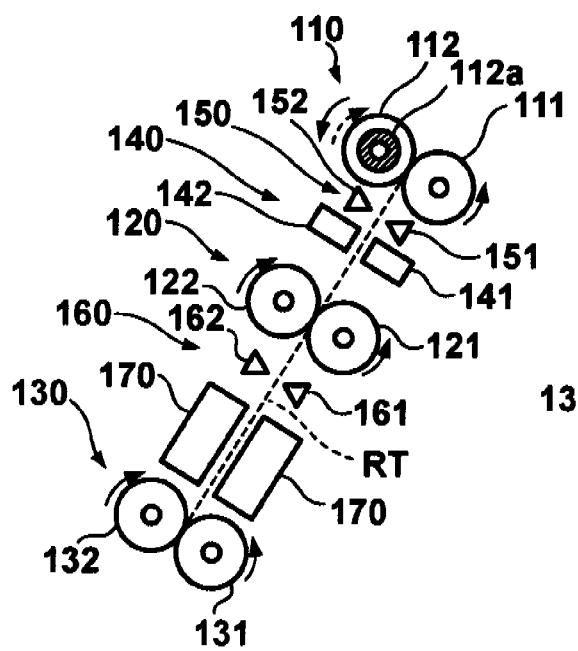
FIGS. 18A to 18C are views showing an example of an upstream-side position detection sensor according to the third embodiment.

In the second embodiment, the position detection sensor 150 is disposed on the downstream side of the multi-feed detection sensor 140, but its position may be arbitrarily set as long as it is located between the first and second conveying units 110 and 120. FIG. 18A shows an example in which the position detection sensor 150 is disposed on the upstream side of the multi-feed detection sensor 140. In this example, after the position detection sensor 150 detects a sheet S (the detection result changes from non-detection→detection) and the sheet S is conveyed by a given amount, the conveyance of the first conveying unit 110 is delayed. Hence, the conveyance can be delayed after the sheet S reaches a multi-feeding detectable position of the multi-feed detection sensor 140. The conveyance by the given amount may be judged with reference to a time period or the number of driving pulses when the driving unit 103 includes a stepping motor.

Figure 18B:
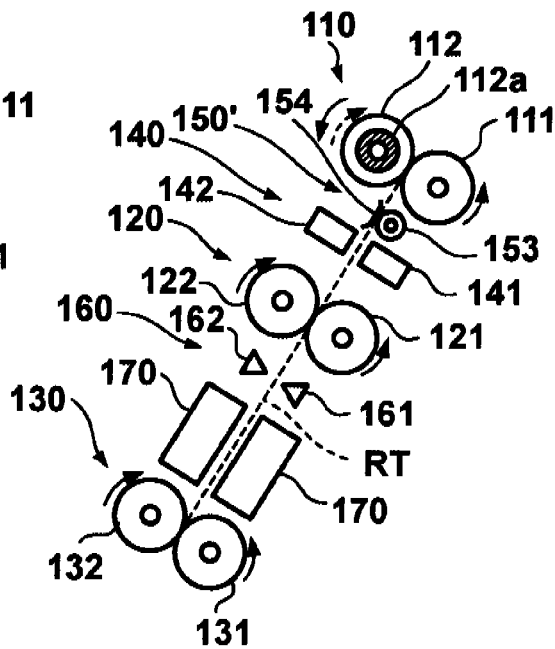

In the second embodiment, the optical sensor has been exemplified as the position detection sensor 150, but sensors of other types may be used. FIG. 18B shows an example in which an encoder 153 is adopted as a position detection sensor 150' in place of the position detection sensor 150. A conveyance guide 154 is disposed to oppose the encoder 153, and a sheet S passes through a gap between the encoder 153 and conveyance guide 154. The encoder 153 contacts the sheet S, is rotated by movement of the sheet S, and outputs a signal proportional to its rotation amount. Based on this signal, whether or not the sheet S has reached a multi-feeding detectable position of the multi-feed detection sensor 140 can be detected.

Figure 18C:
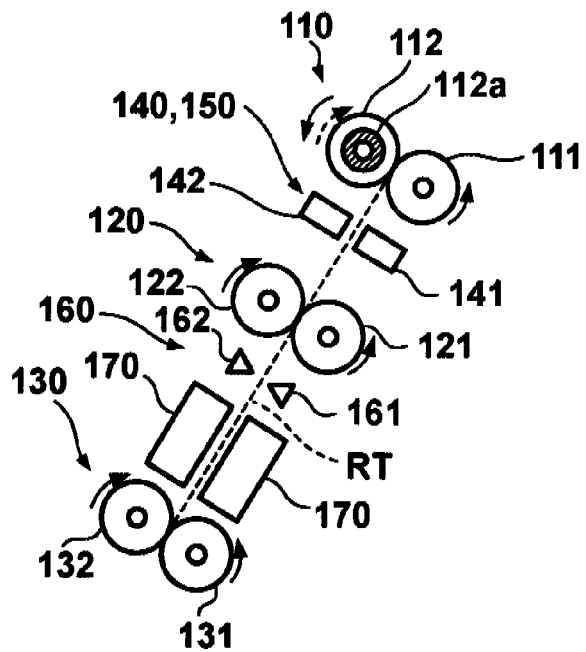

When the ultrasonic sensor is adopted as the multi-feed detection sensor 140, it may be commonly used as the position detection sensor 150. FIG. 18C shows an example in which the multi-feed detection sensor 140 as the ultrasonic sensor is commonly used as the position detection sensor 150. Whether or not the sheet S has reached the multi-feed determination position can be detected based on an attenuation amount of a received signal by the ultrasonic sensor.

Fourth Embodiment

Figure 19:
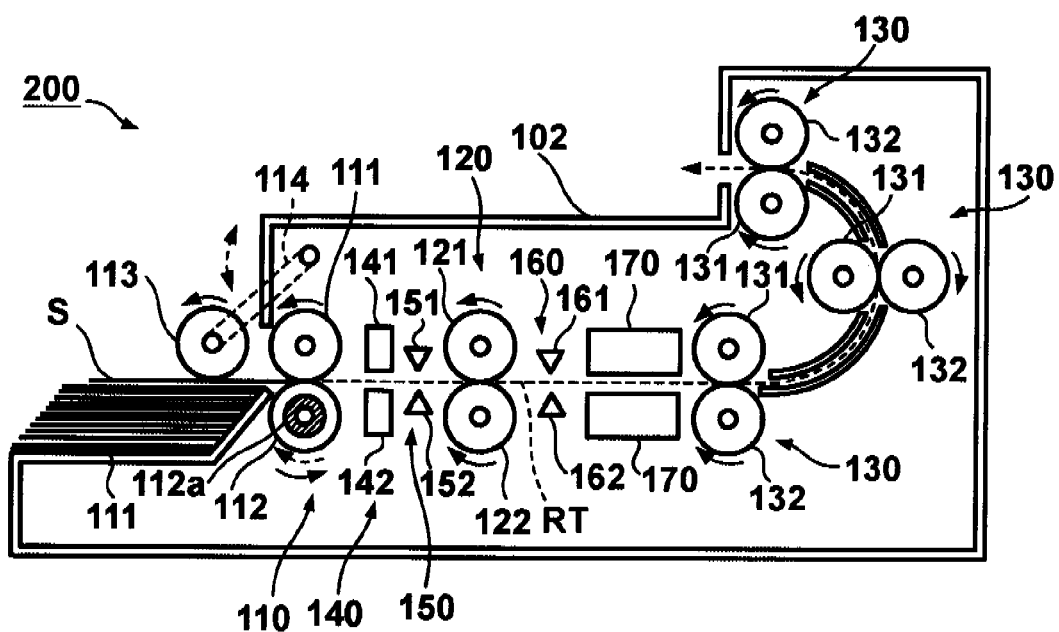
FIG. 19 is a schematic side sectional view showing the arrangement of a document reading apparatus according to the fourth embodiment.

The second embodiment adopts the arrangement in which sheets S on the document tray 101 are conveyed in turn from a lowermost sheet. Alternatively, an arrangement in which sheets S are conveyed in turn from an uppermost sheet may be adopted. FIG. 19 is a schematic view of a document reading apparatus 200 according to the fourth embodiment. The same reference numerals denote the same components as those in the document reading apparatus 100 shown in FIG. 14, a description thereof will not be repeated, and different components will be described below. Note that in FIG. 19, illustrations of the driving units 103 and 104, transmission unit 105, and control unit 106 are omitted.

In the document reading apparatus 200, the first conveying unit 110 includes a pickup roller 113. The pickup roller 113 contacts sheets S stacked on the document tray 101, and is rotated in a direction of an arrow to guide the sheets S in turn from an uppermost sheet to a nip between the feed roller 111 and separation roller 112. The pickup roller 113 is supported by an arm portion 114 which is driven to be pivotal in a direction of a broken arrow. In a normal state, the pickup roller 113 contacts sheets S stacked on the document tray 101. On the other hand, in a reverse feeding state of sheets S, the pickup roller 113 is moved to a position separated upward from the sheets S by a pivotal motion of the arm portion 114, and can be prevented from disturbing the reverse feeding operation of sheets S by the separation roller 112.

In the document reading apparatus 200, three third conveying units 130 are arranged to convey a sheet S along a conveying path RT which is curved into a semicircular shape, and to guide it to the discharge tray 102.

Such document reading apparatus 200 can undergo the same control as in the document reading apparatus 100. Also, the second embodiment and this embodiment can be combined.

Fifth Embodiment

A sheet feeding apparatus according to the fifth embodiment of the present invention will be described below.
<Arrangement of Apparatus>

A feeding mechanism of sheets S will be described first. A sheet feeding apparatus 300 picks up a plurality of sheets S stacked on a document tray 310 one by one, conveys the sheet along a conveying path RT in the apparatus, reads images on the sheet, and then discharges the sheet.

Figure 20:
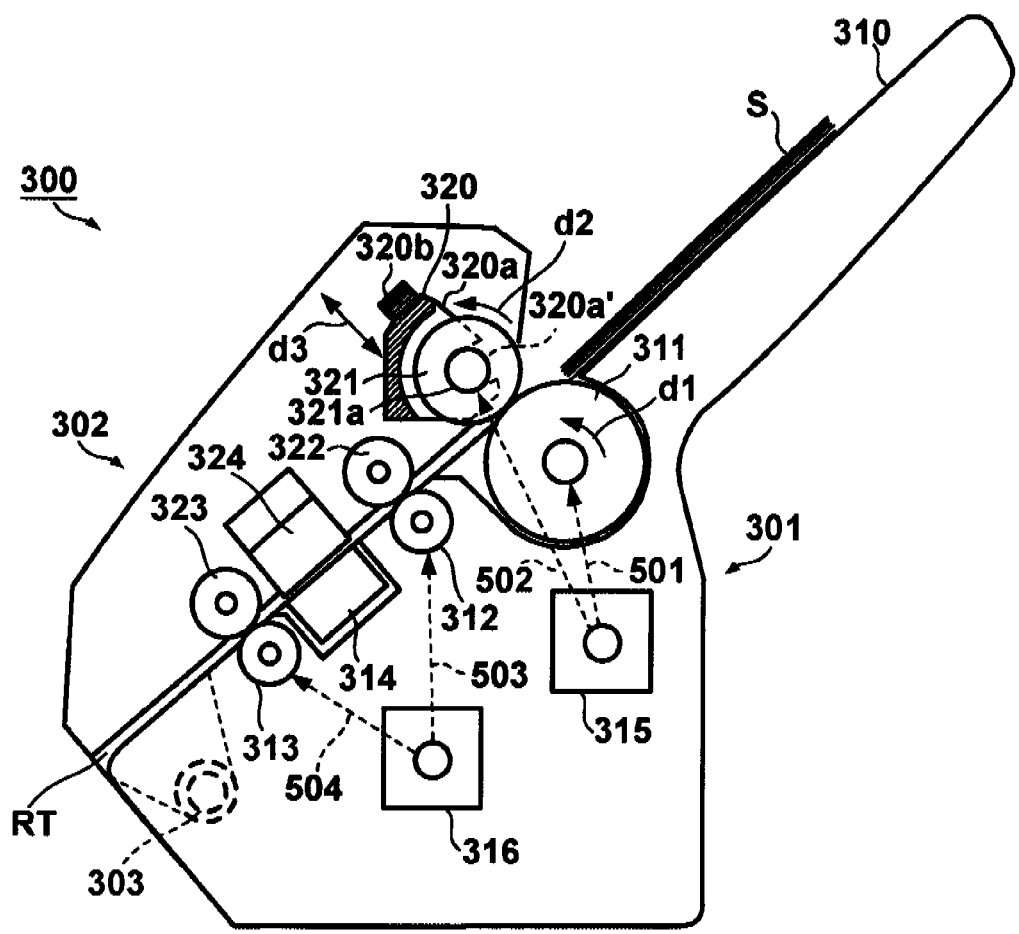
FIG. 20 is a schematic side sectional view showing the arrangement of a sheet feeding apparatus according to the fifth embodiment.

The sheet feeding apparatus 300 includes a lower guide unit 301 which configures a lower unit, and an upper guide unit 302 which configures an upper unit. The upper guide unit 302 is coupled to the lower guide unit 301 to be pivotal about a shaft 303 with respect to the lower guide unit 301, and is displaceable to have the conveying path RT as a boundary. FIG. 20 illustrates a state in which the upper guide unit 302 is closed with respect to the lower guide unit 301, and the conveying path RT is formed between the lower and upper guide units 301 and 302. The conveying path RT has a slope from the upper right side to the lower left side in FIG. 20.

By pivoting the upper guide unit 302 counterclockwise, an open state in which a feed roller 311 and separation roller 321 are separated from each other is set, thereby facilitating an exchange operation of these rollers. Note that in this embodiment, when the upper guide unit 302 is pivoted, it is displaceable with respect to the lower guide unit 301 in directions in which the feed roller 311 and separation roller 321 are close to and separated away from each other. Alternatively, the upper guide unit 302 may be displaced from the lower guide unit 301 by translation or may be simply detached from the lower guide unit 301.

The lower guide unit 301 includes the aforementioned document tray 310, and further includes the following components. The feed roller 311 is used to feed a sheet S on the document tray 310 onto the conveying path RT, and is rotatably supported by the lower guide unit 301. A driving source 315 is a stepping motor or the like, and biases a rotational force to the feed roller 311 via a transmission mechanism 501. The transmission mechanism 501 is, for example, a belt transmission mechanism, and the feed roller 311 is rotated in a direction of an arrow d1 by obtaining the driving force from the transmission mechanism 501.

On the downstream side of the feed roller 311, conveying rollers 312 and 313 are rotatably supported by the lower guide unit 301. A driving source 316 is a stepping motor or the like, and biases a rotational force to the conveying rollers 312 and 313 via transmission mechanisms 503 and 504. The transmission mechanisms 503 and 504 are, for example, belt transmission mechanisms, and the conveying rollers 312 and 313 convey the sheet S toward the downstream side by obtaining the driving forces from the transmission mechanisms 503 and 504.

An image reading unit 314 is supported by the lower guide unit 301 at a position between the conveying rollers 312 and 313.

The arrangement of the upper guide unit 302 will be described below. The separation roller 321 is disposed to oppose the feed roller 311, and is supported by the upper guide unit 302 via an axial support member 320. The separation roller 321 is rotated by the driving source 315 via a transmission mechanism 502. The transmission mechanism 502 is, for example, a gear train. Some gears of this gear train are arranged in the lower guide unit 301, and the remaining gears are arranged in the upper guide unit 302, so as to allow the lower and upper guide units 301 and 302 to be opened/closed, and to allow transmission of the driving force when they are closed.

The axial support member 320 supports a shaft 321a of the separation roller 321 to be rotatable. The axial support member 320 includes a pair of bearings 320a (FIG. 20 illustrates only one bearing), which are spaced apart from each other in the axial direction of the shaft 321a. These bearings 320a are coupled by a coupling portion (indicated by a broken-out section in FIG. 20) extending in the axial direction of the shaft 321a.

Each bearing 320a is formed with a notch 320a' contiguous with a hole which receives the shaft 321a, so that the shaft 321a is attached to or detached from the bearings 320a via the notches 320a'. In this manner, in this embodiment, the separation roller 321 can be detachably attached to the upper guide unit 302. Note that a component for engaging the shaft 321a may be arranged so as to prevent the shaft 321a from dropping from the holes of the bearings 320a via the notches 320a'.

The axial support member 320 is supported by the upper guide unit 302 to be displaceable in a direction of an arrow d3, and an elastic member 320b is mounted between the axial support member 320 and upper guide unit 302. The elastic member 320b is, for example, a coil spring, and always biases the axial support member 320 toward the feed roller 311 side. Thus, the separation roller 321 is in pressure-contact with the feed roller 311 at an appropriate pressure to generate a nip between these rollers. The feed roller 311 and separation roller 321 configure a roller pair used to feed the sheet S.

The separation roller 321 is rotated in a direction of an arrow d2 (in a direction to return a sheet S to the document tray 310). Materials or roughened surface degrees of the outer surfaces of the separation roller 321 and feed roller 311 are set, so that the feed roller 311 has a higher frictional force with respect to a sheet S than that of the separation roller 321.

For this reason, when only one sheet S is fed into the nip between the feed roller 311 and separation roller 321, it is conveyed to the downstream side by the feed roller 311, and the separation roller 321 is rotated idly. On the other hand, when sheets S are multi-fed, since a frictional force between the separation roller 321 and sheet S exceeds that between the multi-fed sheets S, the upper sheet S is returned to the document tray 310, and the lower sheet S is conveyed to the downstream side by the feed roller 311.

On the downstream side of the separation roller 321, driven rollers 322 and 323, which respectively configure roller pairs with the conveying rollers 312 and 313, are rotatably supported by the upper guide unit 302. The driven rollers 322 and 323 are in pressure-contact with the conveying rollers 312 and 313 at a given pressure, and are rotated by the conveying rollers 312 and 313 to convey the sheet S to the downstream side.

An image reading unit 324 is supported by the upper guide unit 302 at a position between the driven rollers 322 and 323.

The image reading units 314 and 324 are disposed to oppose each other, and can read images on obverse and reverse faces of a sheet S. However, only one image reading unit may be disposed on only one side of the conveying path RT to read an image on only one face of a sheet S.

In the sheet feeding apparatus 300 of this embodiment with the aforementioned arrangement, sheets S on the document tray 310 are fed one by one into the apparatus by the feed roller 311 and separation roller 321, and each sheet S is conveyed inside the apparatus by the conveying rollers 312 and 313 and driven rollers 322 and 323 and is then discharged outside the apparatus. During this process, the image reading units 314 and 324 read images on the obverse and reverse faces of the sheet S. The read image data are transmitted to, for example, a computer (not shown).

<Arrangement Around Separation Roller 321>

Figure 21:
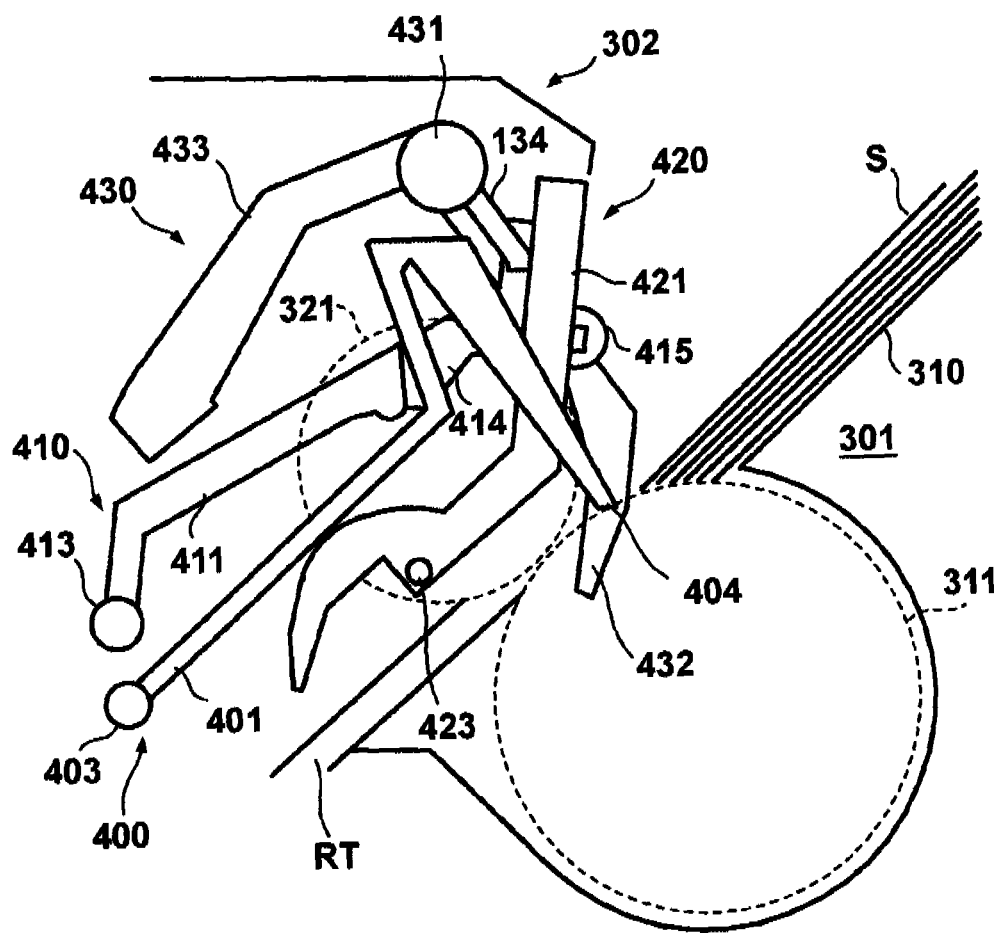
FIG. 21 is a view showing the arrangement around a separation roller.
Figure 22:
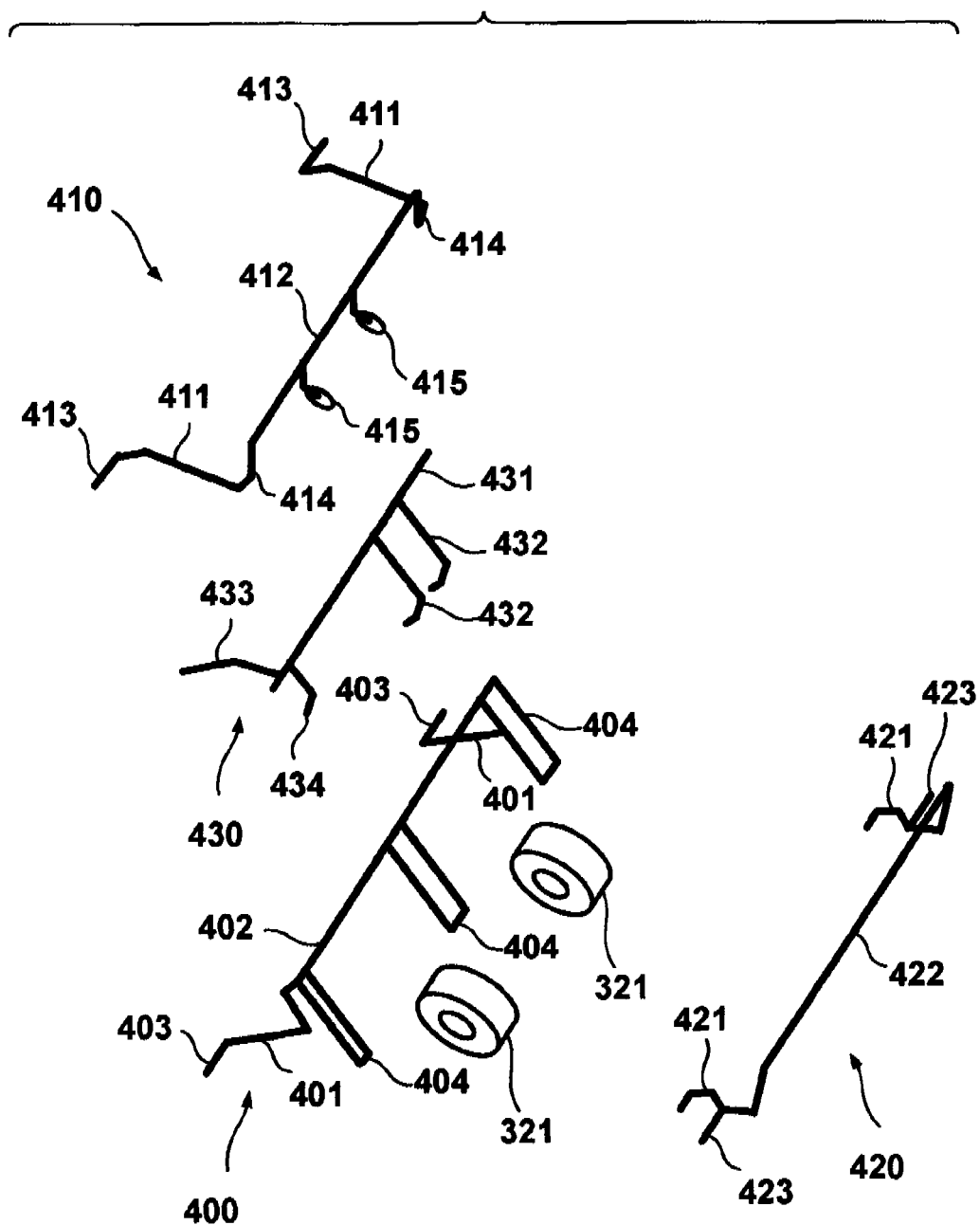
FIG. 22 is an exploded perspective view (skeleton view) of the arrangement around the separation roller.

The arrangement around the separation roller 321 will be described below. FIG. 21 shows the arrangement around the separation roller 321. Around the separation roller 321, a stopper 400, pressing member 410, roller cover 420, and detection member 430 are disposed. FIG. 22 is an exploded perspective view of these components, that is, a more illustrative skeleton view of them. This embodiment assumes an arrangement in which two separation rollers 321 are disposed in their axial direction.

The stopper 400 is an opening/closing member of the conveying path RT, which restricts entrance of a sheet S into the apparatus and releases that restriction. The stopper 400 includes a pair of end portion members 401 which are spaced apart from each other in the axial direction of the separation rollers 321, and a coupling member 402 which couples between the end portion members 401 and extends in a direction parallel to the axial direction of the separation rollers 321. To the end portion members 401, a shaft 403, which is parallel to the axial direction of the separation rollers 321, is connected. The stopper 400 is axially supported by the upper guide unit 302 to be pivotal about the shaft 403 and to be displaceable.

The coupling member 402 is provided with three pawl portions 404 to be spaced apart from each other in its longitudinal direction. The pawl portions 404 are arranged in correspondence with a position between the separation rollers 321 and those outside the separation rollers 321 in the axial direction of the separation rollers 321.

The pressing member 410 is used to press a sheet S against the feed roller 311 for the purpose of eliminating feeding errors. The pressing member 410 includes a pair of end portion members 411 which are spaced apart from each other in the axial direction of the separation rollers 321, and a coupling member 412 which extends in a direction parallel to the axial direction of the separation rollers 321. The end portion members 411 are connected to the coupling member 412 via connection members 414.

The connection members 414 are bent to offset the end portion members 411 outside the coupling member 412. These connection members 414 allow the end portion members 411 to overlap and contact end portion members 421 of the roller cover 420, so as to interlock the pressing member 410 and roller cover 420 with each other, while avoiding an interference between the pressing member 410 and roller cover 420. To the end portion members 411, a shaft 413, which is parallel to the axial direction of the separation rollers 321, is connected. The pressing member 410 is axially supported by the upper guide unit 302 to be pivotal about this shaft 413 and to be displaceable.

To the coupling member 412, rollers 415 are rotatably coupled. The rollers 415 configure pressing portions which contact the upper face of a sheet S to transmit pressing forces to the sheet S. The two rollers 415 are arranged to be spaced apart from each other in the longitudinal direction of the coupling member 412. In an assembled state, the rollers 415 are located on the upstream side of a portion between the two separation rollers 321.

The roller cover 420 is a member which forms a guide surface of a sheet S around the separation rollers 321 (in this embodiment, mainly portions outside the separation rollers 321 in the axial direction of the separation rollers 321), and also serves as a partial protection member of the separation rollers 321. The roller cover 420 includes a pair of end portion members 421 which are spaced apart from each other in the axial direction of the separation rollers 321, and a coupling member 422 which couples between the end portion members 421 and extends in a direction parallel to the axial direction of the separation rollers 321. To the end portion members 421, a shaft 423, which is parallel to the axial direction of the separation rollers 321, is connected. The roller cover 420 is axially supported by the upper guide unit 302 to be pivotal about this shaft 423 and to be displaceable.

The detection member 430 is used to detect the presence/absence of a sheet S. The detection member 430 includes a shaft 431, which extends in a direction parallel to the axial direction of the separation rollers 321. The detection member 430 is axially supported by the upper guide unit 302 to be pivotal about the shaft 431 and to be displaceable. To the shaft 431, arm portions 432, to which a sheet S contacts, a to-be-detected portion 433, and a pivot restriction portion 434 are connected.

<Functions of Stopper 400 and Pressing Member 410>

Figure 23A:
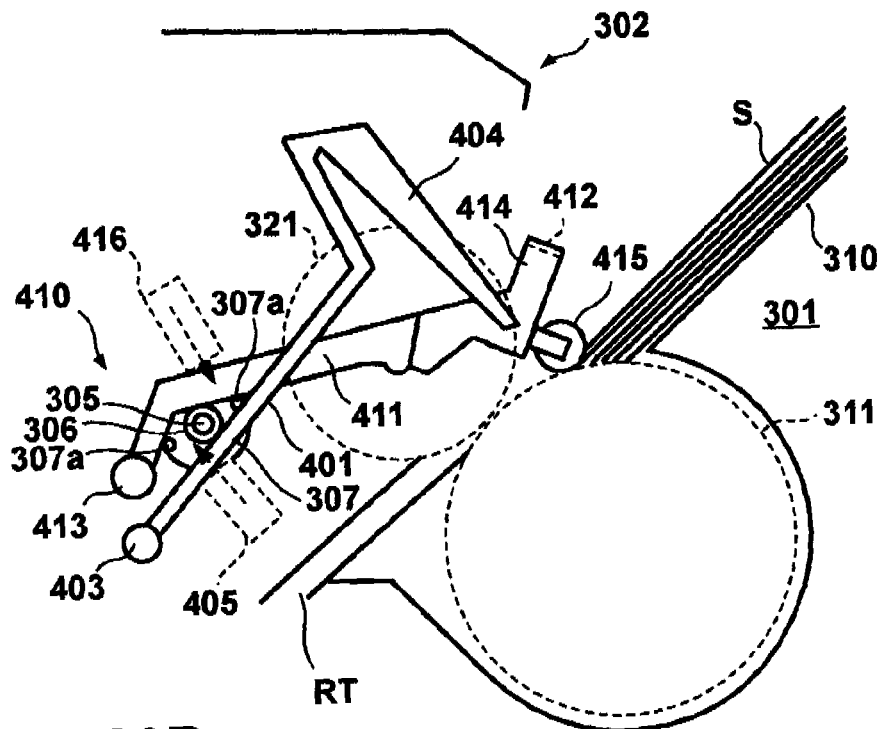
FIGS. 23A and 23B are explanatory views of a stopper and pressing member.

The functions of the stopper 400 and pressing member 410 will be described below with reference to FIGS. 23A and 23B. FIG. 23A shows aspects of the stopper 400 and pressing member 410 in a feeding state, and FIG. 23B shows those of the stopper 400 and pressing member 410 in a feeding standby state.

In the feeding state shown in FIG. 23A, in order to allow a sheet S to enter into the apparatus, the stopper 400 is located at a standby position where the pawl portions 404 are separated upward from nips between the feed roller 311 and separation rollers 321. An elastic member 405 is, for example, a coil spring, which always biases the stopper 400 in a direction of an arrow. Thus, the stopper 400 is always biased toward the standby position side.

In the feeding state shown in FIG. 23A, the pressing member 410 is located at a pressing position where its rollers 415 contact an upper face of the sheet S on the upstream side of the separation rollers 321, and press the sheet S against the feed roller 311. A pressing force is biased by an elastic member 416. The elastic member 416 is, for example, a coil spring, which always biases the pressing member 410 in a direction of an arrow. Thus, the pressing member 410 is always biased toward the pressing position side.

Figure 23B:
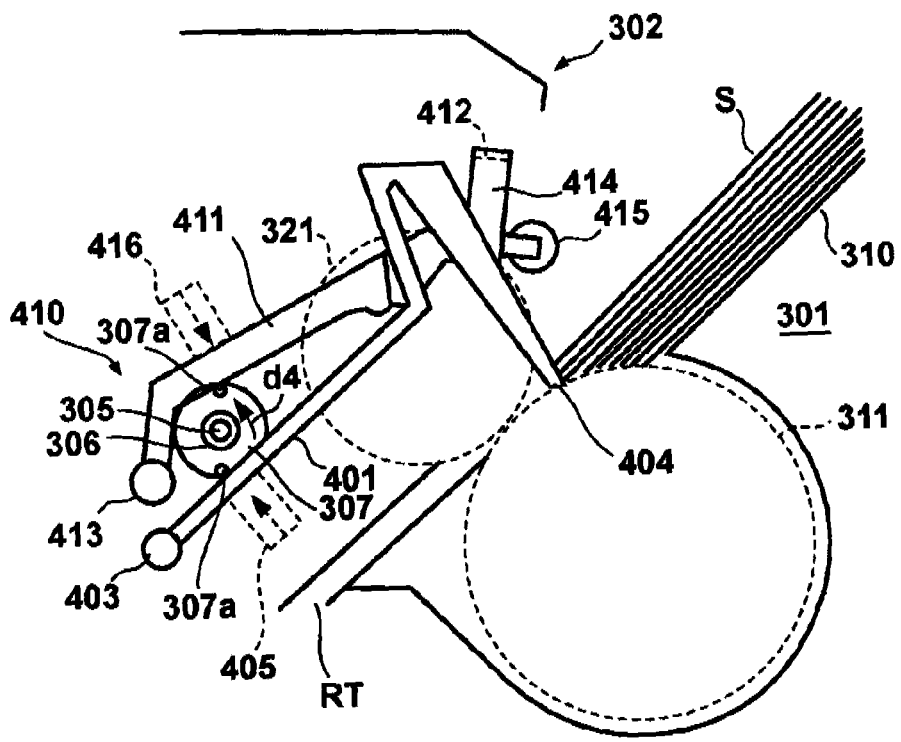

In the feeding standby state shown in FIG. 23B, the stopper 400 is pivoted clockwise in FIG. 23B from the standby position about its shaft 403, and is located at a restriction position where the pawl portions 404 move to positions slightly on the upstream side of the nips between the feed roller 311 and separation rollers 321, and stop sheets S so as not to enter into the apparatus. The pressing member 410 is pivoted counterclockwise in FIG. 23B from the pressing position about its shaft 413, and is located at a standby position where the rollers 415 are separated away from the sheets S.

As a driving mechanism for displacing the stopper 400 and pressing member 410 from the positions shown in FIG. 23A to those shown in FIG. 23B, various arrangements are available. This embodiment adopts the following arrangement shown in FIGS. 23A and 23B.

A shaft 305 is rotatably supported by the upper guide unit 302. To the shaft 305, a rotary disk 307 is connected via a one-way clutch 306. Contact pins 307a stand up from the rotary disk 307, so that one contact pin 307a contacts the upper surface of one end portion member 401 of the stopper 400, and the other contacts the lower surface of one end portion member 411 of the pressing member 410.

The shaft 305 is rotated by a driving force from a driving source (not shown). This embodiment assumes a case in which the shaft 305 is rotated by the driving force from the driving source 316 which rotates the conveying rollers 312 and 313. The driving force is transmitted from the driving source 316 to the shaft 305 via a gear train. Some gears of the gear train are arranged in the lower guide unit 301 and the remaining gears are arranged in the upper guide unit 302, so as to allow the lower and upper guide units 301 and 302 to be opened/closed, and to allow transmission of the driving force when they are closed.

The one-way clutch 306 is designed to transmit a driving force when the shaft 305 is rotated in a direction of an arrow d4 in FIG. 23B. Then, the gears of the gear train are combined to rotate the shaft 305 in the direction of the arrow d4 when a rotational direction of the driving source 316 is that to rotate the conveying rollers 312 and 313 in the reverse direction. Thus, in the feeding state, the shaft 305 is rotated in a direction opposite to the direction of the arrow d4, the one-way clutch 306 does not transmit any driving force, and the state shown in FIG. 23A can be set by the biasing forces of the elastic members 405 and 416. On the other hand, upon transition from the feeding state to the feeding standby state, the shaft 305 is rotated by a predetermined amount in the direction of the arrow d4, thus setting the state shown in FIG. 23B.

<Functions of Roller Cover 420 and Detection Member 430>

Figure 24A:
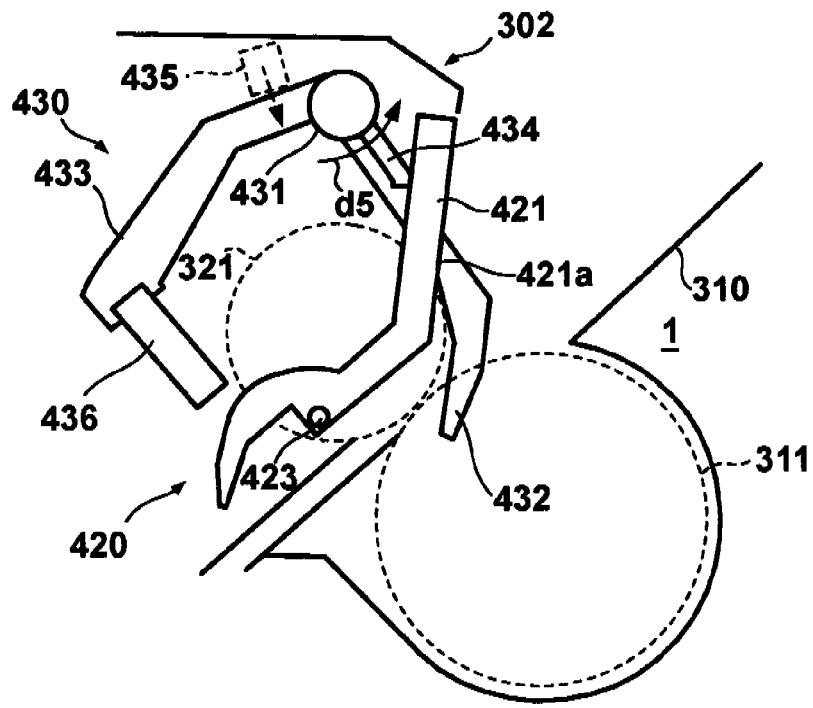
FIGS. 24A and 24B are explanatory views of a roller cover and detection member.

The functions of the roller cover 420 and detection member 430 will be described below with reference to FIGS. 24A and 24B. FIG. 24A shows a case in which no sheets S are set, and FIG. 24B shows a case in which a sheet S is being fed.

Figure 24B:
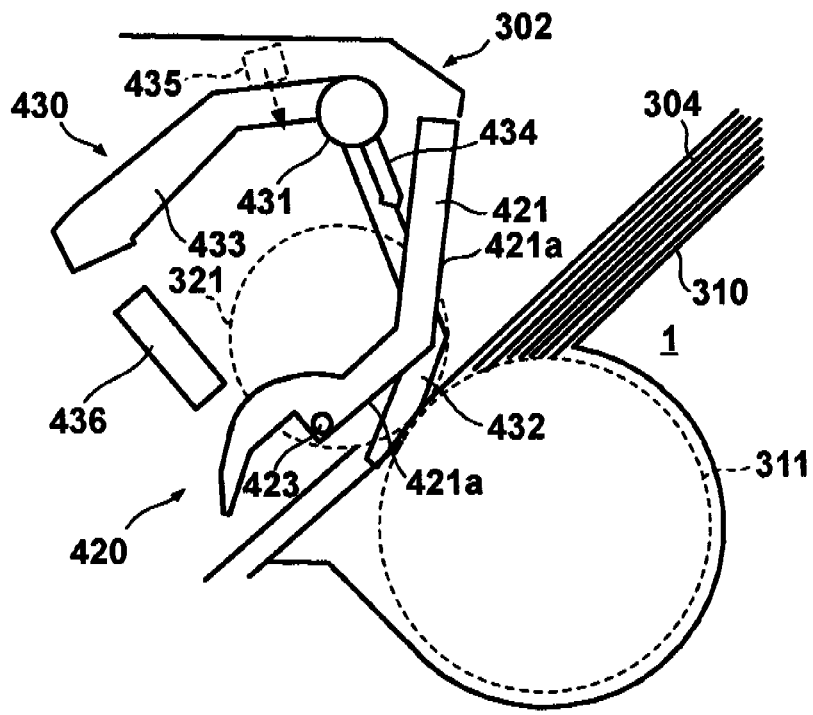

In case of FIGS. 24A and 24B, the roller cover 420 is located at a closed position where it forms the guide surface of a sheet S around the separation roller 321. In the example shown in FIGS. 24A and 24B, lower surfaces 421a of the end portion members 421 configure the guide surface of a sheet S. Even when a large number of sheets S are stacked on the document tray 310, the guide surface can guide a sheet S to the nips between the feed roller 311 and separation rollers 321. The roller cover 420 is located at this closed position except for an exchange timing of the separation rollers 321, and is engaged with the upper guide unit 302 by an engaging mechanism (not shown) so as not to be unexpectedly pivoted.

When the roller cover 420 is located at the closed position, the detection member 430 is located at a contact position (that in FIG. 24A), where a sheet S contacts its arm portions 432, on the upstream side of the separation rollers 321. The detection member 430 is always biased by an elastic member 435.

The elastic member 435 is, for example, a coil spring, which always biases the detection member 430 in a direction of an arrow. Thus, the detection member 430 is always biased in a direction of an arrow d5 (toward a retracted position side to be described later). However, the pivot restriction portion 434 contacts the upper surface of one end portion member 421 of the roller cover 420, thereby restricting a pivotal motion.

When the detection member 430 is located at the contact position, the to-be-detected portion 433 is detected by a sensor 436. The sensor 436 is supported by the upper guide unit 302, and is, for example, an optical sensor (photointerrupter).

When a sheet S is being fed, the sheet S contacts the arm portions 432 to give, to the detection member 430, a clockwise pivot force in FIG. 24A about the shaft 431. Then, the detection member 430 is pivoted against the biasing force of the elastic member 435, and is displaced to a position (detection position) shown in FIG. 24B. At this time, the to-be-detected portion 433 secedes from the sensor 436, and its existence is no longer be detected by the sensor 436.

Note that the same applies to a case in which a sheet S is being fed, and sheets S exist on the document tray 310. In this case, when the stopper 400 is located at the restriction position (FIG. 24B) but the detection member 430 is located at the contact position, the arm portions 432 are located on the upstream side of the pawl portions 404 of the stopper 400, and the detection member 430 is displaced from the contact position to the detection position since the sheet S is brought into contact with the arm portions 432. Note that the detection position in this case is that closer to the contact position side than the position shown in FIG. 24B although the to-be-detected portion 433 secedes from the sensor 436.

In this way, when the to-be-detected portion 433 is detected by the sensor 436, it can be determined that no sheet S is available, and when it is not detected, it can be determined that sheets S are available (in the feeding or feeding standby state).

<Exchange of Separation Rollers 321>

The operation of the sheet feeding apparatus 300 at the exchange timing of the separation rollers 321 will be described below with reference to FIGS. 25A and 25B and FIG. 26. An operator who exchanges the separation rollers 321 pivots the upper guide unit 302 about the shaft 303 with respect to the lower guide unit 301 to set it in an open state. Thus, an operation space required to exchange the separation rollers 321 is assured between the lower and upper guide units 301 and 302.

Figure 25A:
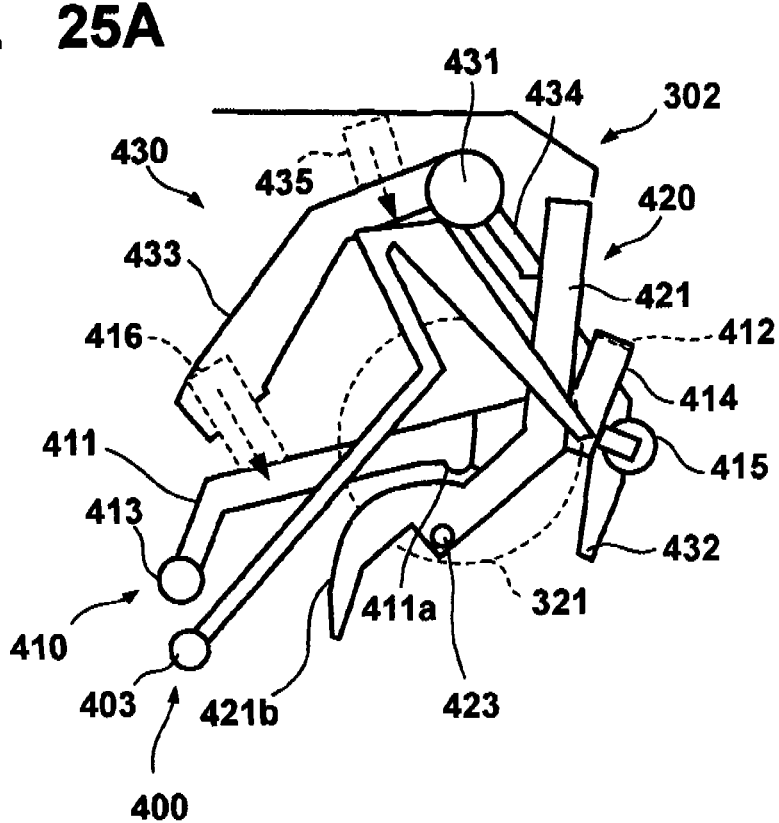
FIGS. 25A and 25B are explanatory views of the operation at an exchange timing of the separation roller.

FIG. 25A shows an aspect around the separation rollers 321 of the upper guide unit 302 set in the open state. In this stage, the roller cover 420 is located at the closed position. Hence, the detection member 430 is located at the contact position. The stopper 400 and pressing member 410 are located at positions in the feeding state shown in FIG. 23A. That is, the stopper 400 is located at the standby position, and the pressing member 410 is located at the pressing position. This is because the shaft 305 is not rotated, and the stopper 400 and pressing member 410 are biased by the elastic members 405 and 416.

In the state shown in FIG. 25A, upon taking out the separation rollers 321, not only the roller cover 420 and but also, for example, the pressing member 410 and detection member 430 still lie in the way. The stopper 400 is cleared out of the way since it is located at the standby position. Hence, the pressing member 410 and detection member 430 are displaced to be interlocked with the displacement of the roller cover 420.

Figure 25B:
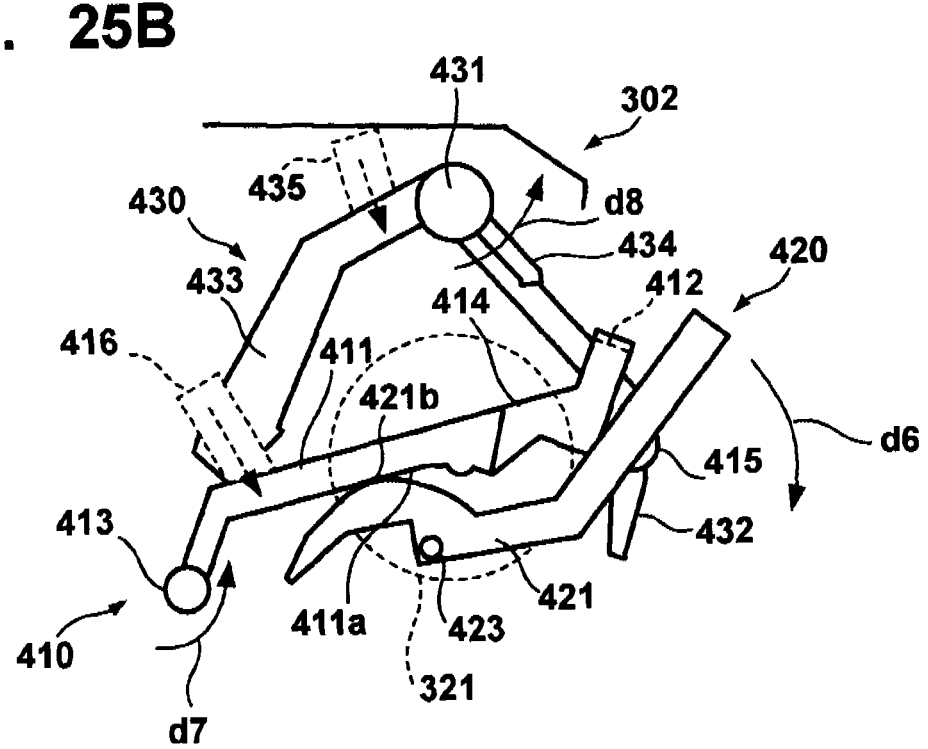

FIG. 25B shows a halfway state when the roller cover 420 is pivoted in a direction of an arrow d6 about its shaft 423 from the state shown in FIG. 25A (closed position) to be displaced to an open position where the separation rollers 321 can be detached from the upper guide unit 302. The operator manually pivots the roller cover 420. Note that in FIG. 25B, an illustration of the stopper 400 is omitted.

When the roller cover 420 is pivoted from the closed position in the direction of the arrow d6, the pivot restriction portion 434 no longer contacts the upper surface of the end portion member 421 of the roller cover 420 to release the pivotal restriction of the detection member 430. Hence, detection member 430 is pivotal in a direction of an arrow dB by the biasing force of the elastic member 321. However, since the coupling member 412 of the pressing member 410 extends above the arm portions 432 of the detection member 430, the arm portions 432 and coupling member 412 interfere with each other.

However, since the end portion members 421 of the roller cover 420 and the end portion members 411 of the pressing member 410 vertically overlap each other, when the roller cover 420 is pivoted from the closed position in the direction of the arrow d6, upper surfaces 421b of the end portion members 421 contact lower surfaces 411a of the end portion members 411 of the pressing member 410 to pivot the pressing member 410 in a direction of an arrow d7. For this reason, as the roller cover 420 is pivoted in the direction of the arrow d6, the pressing member 410 is pivoted in the direction of the arrow d7 and the detection member 430 is pivoted in the direction of the arrow d8. Note that in this embodiment, cam surfaces as curved surfaces are respectively partially formed on the upper surfaces 421b and lower surfaces 411a to attain intended interlocking actions.

Figure 26:
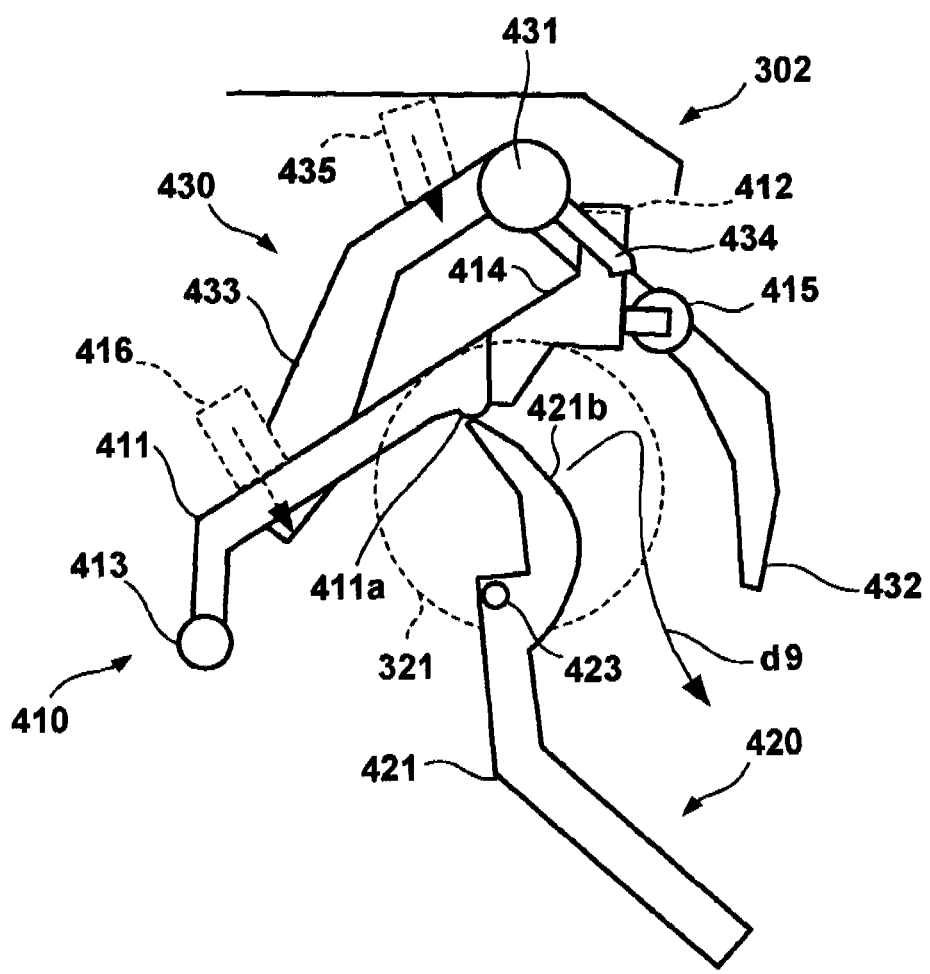
FIG. 26 is an explanatory view of the operation at the exchange timing of the separation roller.

FIG. 26 shows a state in which the displacement of the roller cover 420 to the closed position is complete. The pressing member 410 and detection member 430 are also respectively displaced to retracted positions where the separation rollers 321 can be detached from the upper guide unit 302. A free space where the operator can insert his or her hand is assured at a lower right position of the separation rollers 321 in FIG. 26, and the operator can take out the separation rollers 321 from the axial support member 320 shown in FIG. 20 along a route indicated by an arrow d9. As described above, according to this embodiment, since the pressing member 410 and detection member 430 are displaced to be interlocked with the displacement of the roller cover 420, these peripheral components of the separation rollers 321 can avoid the exchange operability of the separation rollers 321 from lowering.

A sequence for attaching new separation rollers 321 is opposite to that for detaching them. That is, in the state shown in FIG. 26, new separation rollers 321 are attached, and the roller cover 420 is pivoted to be displaced to the closed position. Then, the pressing member 410 is returned to the pressing position by the biasing force of the elastic member 416. Also, according to the return action of the pressing member 410 to the pressing position, the arm portions 432 of the detection member 430 are pressed by the coupling member 412 of the pressing member 410, and the pivot restriction portion 434 also contacts the roller cover 420. Then, the detection member 430 is returned to the contact position.

As described above, according to this embodiment, the detection member 430 is displaced from the retracted position to the contact position, and the pressing member 410 is displaced from the retracted position to the pressing position, so as to be interlocked with the displacement of the roller cover 420 from the open position to the closed position, thus improving the exchange operability.

In this embodiment, a mechanism for displacing the pressing member 410 and detection member 430 to be interlocked with the displacement of the roller cover 420 uses the biasing forces of the elastic members 416 and 435, and contacting between the roller cover 420, and the pressing member 410 and detection member 430. Hence, the interlocking mechanism can be realized by a relatively simple arrangement.

Note that in this embodiment, the displacements of the roller cover 420, pressing member 410, and detection member 430 are attained by their pivotal motions, but they may be attained by their translations or members to be pivoted and those to be translated may be mixed.

In this embodiment, both the pressing member 410 and detection member 430 are arranged. Alternatively, one of these members may be arranged. In this case, that member may be displaced to be interlocked with the displacement of the roller cover 420.

This embodiment targets at the separation rollers 321. Also, the arrangement of this embodiment (for example, the interlocking mechanism of the roller cover 420, pressing member 410, and detection member 430) is applicable as peripheral structures of various kinds of rollers which configure roller pairs.

Note that in this embodiment, the pressing member 410 is displaced from the pressing position to the retracted position, and the detection member 430 is displaced from the contact position to the retracted position, so as to be interlocked with the displacement of the roller cover 430 from the closed position to the open position. Of course, the present invention is not limited to this. For example, only the pressing member may be displaced from the pressing position to the retracted position or only the detection member may be displaced from the contact position to the retraced position, so as to be interlocked with the displacement of the roller cover from the closed position to the open position. That is, a sheet feeding apparatus which allows at least one of the pressing member to be displaced from the pressing position to the retracted position and the detection member to be displaced from the contact position to the retracted position, so as to be interlocked with the displacement of the roller cover from the closed position to the open position, may be adopted. In this case, since at least one of the detection member and pressing member is displaced, roller peripheral members can avoid in no small part the roller exchange operability from lowering.

The aforementioned embodiment has exemplified the case in which the present invention is practiced by application to the document reading apparatus. Of course, the present invention is not limited to this. For example, the present invention can target at a sheet feeding apparatus which feeds documents and paper sheets (sheets), and is also applicable to an apparatus (an image reading apparatus or image forming apparatus) which applies various kinds of processing such as document reading processing and image forming processing while conveying documents as sheets, and a system including such apparatus and an information processing apparatus such as a computer. When the present invention is applied to the system in this way, the sheet feeding apparatus or the image reading apparatus or image forming apparatus including this sheet feeding apparatus may be controlled based on control signals from a driver, application program, or the like, which runs on the computer. In this case, the control unit which controls driving of the driving units for the stoppers, feed roller, and the like is the computer (that is, a CPU or the like).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-252192 filed Nov. 10, 2010, No. 2010-259495 filed Nov. 19, 2010, and No. 2011-093497 filed Apr. 19, 2011, which are hereby incorporated by reference herein in their entireties.

What is claimed is:

1. A sheet feeding apparatus comprising:
   a conveying path formed between an upper unit and a lower unit, which are disposed to face each other;
   a feed roller which feeds a sheet by contacting the sheet with a portion partially exposed from an upper surface of the lower unit to the conveying path;
   a separation member which is disposed to oppose the feed roller;
   a stopper disposed on an upstream side in a sheet feeding direction of a nip portion between the feed roller and the separation member when the stopper is in a closed state, and which stops entrance of a sheet bundle into the conveying path by abutting against a leading end portion of the sheet bundle in the closed state in which the stopper is moved in a direction to intersect with an exposed surface of the feed roller;
   a driving unit which drives the feed roller and the stopper; and
   a control unit which controls the driving unit to rotate the feed roller through a predetermined angle in the sheet feeding direction in a state that the lowermost sheet of the sheet bundle placed on an upper surface of the lower unit is in contact with the feed roller for aligning a leading end portion of the lowermost sheet of the sheet bundle by the stopper, and to then open the stopper after the sheet bundle is aligned by the stopper so as to separate the lowermost sheet by the feed roller and the separation member and feed the separated lowermost sheet in the sheet feeding direction.

2. The apparatus according to claim 1, wherein letting L1 be a length of the exposed surface and L2 be a full length of an outer surface of the feed roller, the predetermined angle is set to rotate the feed roller by at least L1/L2 in the sheet feeding direction.

3. The apparatus according to claim 1, further comprising a pickup unit which presses the sheet toward the feed roller side on an upstream side of the stopper.

4. The apparatus according to claim 3, wherein the control unit controls the driving unit to move the pickup unit to the feed roller side before the stopper is opened.

5. The apparatus according to claim 3, wherein the control unit controls the driving unit to rotate the feed roller through the predetermined angle in the sheet feeding direction while the stopper is in the closed state and the pickup unit presses the sheet.

6. The apparatus according to claim 3, wherein the driving unit comprises a feeding driving system which drives the feed roller, and a stopper driving system which drives the stopper and the pickup unit to be interlocked with each other via a cam member.

7. The apparatus according to claim 3, wherein the pickup unit comprises a rib-shaped portion which projects in a direction intersecting with an abutting surface of the leading end portion of the lower most sheet of the sheet bundle against the stopper.

8. A document reading apparatus which mounts a sheet feeding apparatus of claim 1, and comprises an image reading unit used to read an image of a document to be fed as a sheet.

9. A method of controlling a sheet feeding apparatus comprising:
　　a conveying path formed between an upper unit and a lower unit, which are disposed to face each other;
　　a feed roller which feeds a sheet by contacting the sheet with a portion partially exposed from an upper surface of the lower unit to the conveying path;
　　a separation member which is disposed to oppose the feed roller;
　　a stopper disposed on an upstream side in a sheet feeding direction of a nip portion between the feed roller and the separation member when the stopper is in a closed state, and which stops entrance of a sheet bundle into the conveying path by abutting against a leading edge portion of the sheet bundle in the closed state in which the stopper is moved in a direction to intersect with an exposed surface of the feed roller; and
　　a driving unit which drives the feed roller and the stopper, the method comprising a step of controlling the driving unit to rotate the feed roller through a predetermined angle in a sheet feeding direction in a state that the lowermost sheet of the sheet bundle placed on an upper surface of the lower unit is in contact with the feed roller for aligning a leading end portion of the lowermost sheet of the sheet bundle by the stopper, and a step of opening the stopper after the sheet bundle is aligned by the stopper so as to separate the lowermost sheet by the feed roller and the separation member and feed the separated lowermost sheet in the sheet feeding direction.

* * * * *